United States Patent
Hayashi

(10) Patent No.: US 9,760,319 B2
(45) Date of Patent: Sep. 12, 2017

(54) SYSTEM, PRINTING APPARATUS AND METHOD FOR CONTROLLING THE SAME, AND POST-PROCESSING APPARATUS AND METHOD FOR CONTROLLING THE SAME

(71) Applicant: CANON KABUSHIKI KAISHA, Tokyo (JP)

(72) Inventor: Kimio Hayashi, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 15/092,267

(22) Filed: Apr. 6, 2016

(65) Prior Publication Data

US 2016/0299727 A1    Oct. 13, 2016

(30) Foreign Application Priority Data

Apr. 10, 2015    (JP) ................................. 2015-081159

(51) Int. Cl.
G06K 15/00 (2006.01)
G06F 3/12 (2006.01)
G06K 15/02 (2006.01)

(52) U.S. Cl.
CPC .......... *G06F 3/1217* (2013.01); *G06F 3/1275* (2013.01); *G06K 15/1809* (2013.01); *G06K 15/4025* (2013.01)

(58) Field of Classification Search
None
See application file for complete search history.

(56) References Cited

U.S. PATENT DOCUMENTS

| | | |
|---|---|---|
| 2007/0109586 A1 | 5/2007 | Yamada et al. |
| 2007/0291286 A1 | 12/2007 | Utsunomiya et al. |
| 2009/0052913 A1 | 2/2009 | Kawamura et al. |
| 2009/0279137 A1 | 11/2009 | Mori |
| 2010/0271672 A1* | 10/2010 | Nakamichi .......... H04N 1/0057 358/498 |
| 2013/0120799 A1 | 5/2013 | Maeda |
| 2016/0299726 A1* | 10/2016 | Hayashi ................ G06F 3/1217 |
| 2016/0299731 A1 | 10/2016 | Kayama |
| 2016/0299732 A1 | 10/2016 | Mori |

FOREIGN PATENT DOCUMENTS

| | | |
|---|---|---|
| JP | 2007-241648 A | 9/2007 |
| JP | 2008-110576 A | 5/2008 |

* cited by examiner

*Primary Examiner* — Dov Popovici
(74) *Attorney, Agent, or Firm* — Canon USA, Inc. I.P. Division

(57) ABSTRACT

At least one embodiment of a post-processing apparatus performs post-processing on a product printed by a printing apparatus, and transmits a command for a temporary stop of print processing for a first job and information indicating a reason for the temporary stop to the printing apparatus. At least one embodiment of the printing apparatus receives the command for the temporary stop of the print processing for the first job and the information indicating the reason for the temporary stop, stops the print processing for the first job according to the command for the temporary stop, and acquires a period of time during which the temporary stop continues based on the received information indicating the reason for the temporary stop.

12 Claims, 19 Drawing Sheets

FIG.5
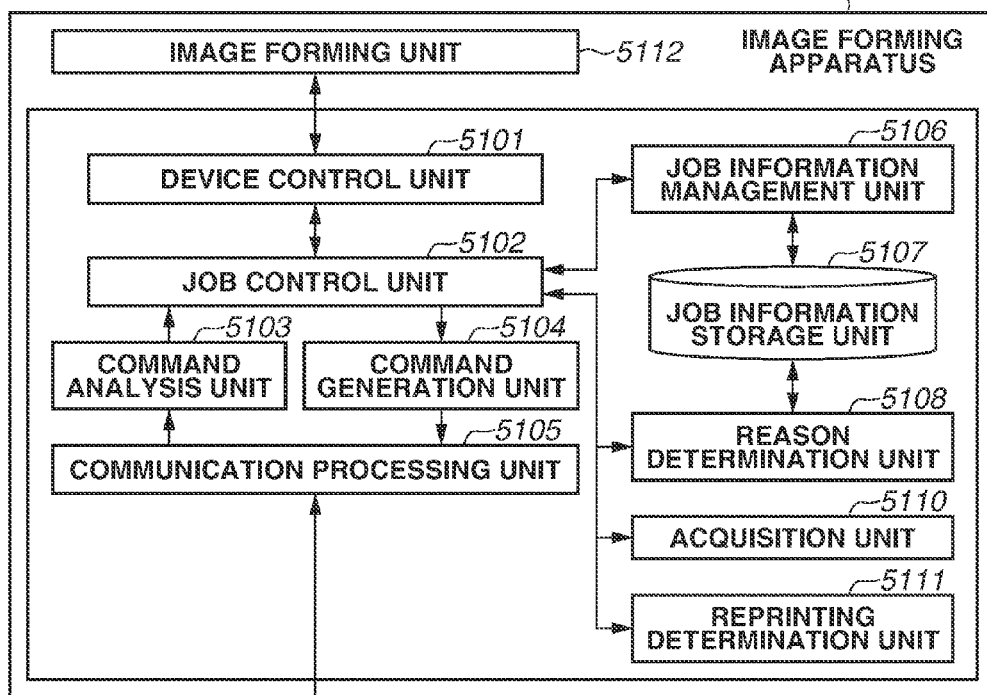
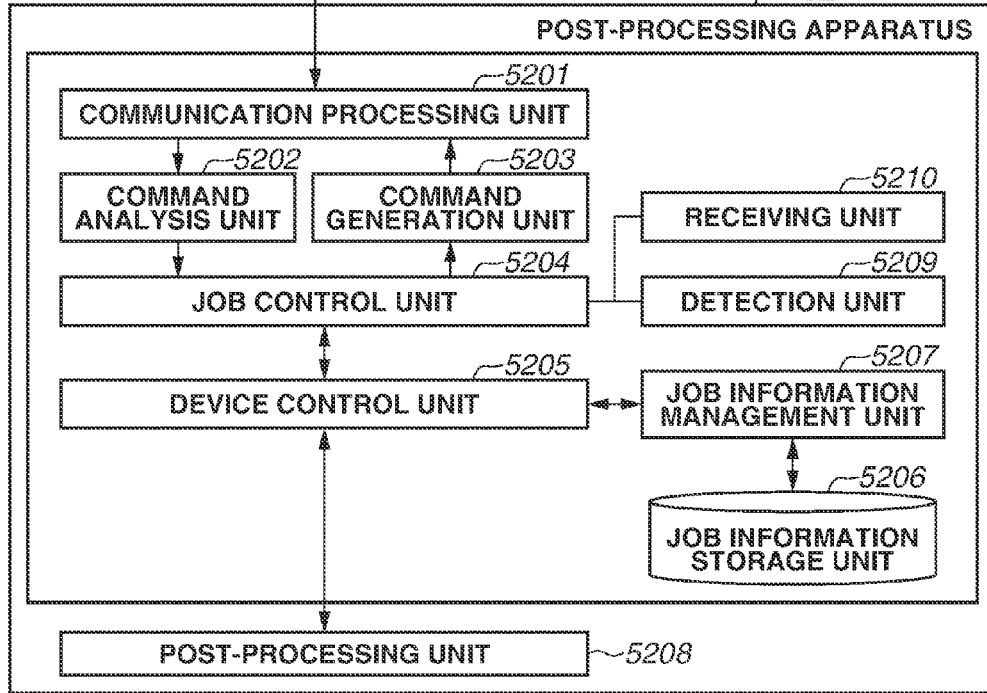

```
<JMF xmlns="http://www.CIP4.org/JDFSchema_1_1" MaxVersion="1.5" SenderID="Finisher" TimeStamp="2013-09-
18T10:58:27+02:00" Version="1.5" xmlns:xsi="http://www.w3.org/2001/XMLSchema-instance" xsi:type="JMFRootMessage">
    <Command ID="m.609016672._000009" Type="PipePause" xsi:type="CommandPipePause" DeviceID="PerfectBinder">
        <PipeParams JobID="J1" PipeID="PipeSheet" Reason="Error" StatusDetails="PaperJam">  ~61001
            <AmountPool>                                                                      61002
                <PartAmount>
                    <PartCondition="Waste" SetIndex="34 35"/> ~61003
                </PartAmount>
            </AmountPool>
        </PipeParams>
    </Command>
</JMF>
```

6101

```
<JMF xmlns="http://www.CIP4.org/JDFSchema_1_1" MaxVersion="1.5" SenderID="Finisher" TimeStamp="2013-09-
18T10:58:27+02:00" Version="1.5" xmlns:xsi="http://www.w3.org/2001/XMLSchema-instance" xsi:type="JMFRootMessage">
    <Command ID="m.609016672._000009" Type="PipePause" xsi:type="CommandPipePause" DeviceID="PerfectBinder">
        <PipeParams JobID="J1" PipeID="PipeSheet" Reason="Warning" StatusDetails="DoorOpen"> ~61004
    </Command>
</JMF>
```

6102

```
<JMF xmlns="http://www.CIP4.org/JDFSchema_1_1" MaxVersion="1.5" SenderID="Finisher" TimeStamp="2013-09-
18T10:58:27+02:00" Version="1.5" xmlns:xsi="http://www.w3.org/2001/XMLSchema-instance" xsi:type="JMFRootMessage">
    <Command ID="m.609016672._000009" Type="PipePause" xsi:type="CommandPipePause" DeviceID="PerfectBinder">
        <PipeParams JobID="J1" PipeID="PipeSheet" Reason="ExceededIntendedQuantity"/> ~61005
    </Command>
</JMF>
```

```
<JMF xmlns="http://www.CIP4.org/JDFSchema_1_1" MaxVersion="1.5" SenderID="Printer" TimeStamp="2013-09-18T10:58:26+02:00"
Version="1.5" xmlns:xsi="http://www.w3.org/2001/XMLSchema-instance" xsi:type="JMFRootMessage">
    <Command ID="m.1349935098._000002" Type="PipePush" xsi:type="CommandPipePush">
        <PipeParams JobID="J1" PipeID="PipeSheet">                                    ~62001
            <AmountPool>           ~62002
                <PartAmount Amount="1">
                    <Part DocTags="Cover" SetIndex="0"/>
                </PartAmount>
                <PartAmount ActualAmount="1">
                    <Part DocTags="Cover" SetIndex="0" SheetIndex="0"/>
                </PartAmount>
            </AmountPool>
        </PipeParams>
    </Command>
</JMF>
```

6201

```
<JMF xmlns="http://www.CIP4.org/JDFSchema_1_1" MaxVersion="1.5" SenderID="Printer" TimeStamp="2013-09-18T10:58:27+02:00"
Version="1.5" xmlns:xsi="http://www.w3.org/2001/XMLSchema-instance" xsi:type="JMFRootMessage">
    <Command ID="m.1349935098._000008" Type="PipePush" xsi:type="CommandPipePush">
        <PipeParams JobID="J1" PipeID="PipeSheet">
            <AmountPool>
                <PartAmount Amount="7">
                    <Part DocTags="Body" SetIndex="35"/>  ~62011
                </PartAmount>
                <PartAmount ActualAmount="1">
                    <Part DocTags="Body" SetIndex="35" SheetIndex="4"/>
                </PartAmount>
            </AmountPool>
        </PipeParams>
    </Command>
</JMF>
```

```
<JMF xmlns="http://www.CIP4.org/JDFSchema_1_1" MaxVersion="1.5" SenderID="TestSender" TimeStamp="2013-09-
18T10:58:27+02:00" Version="1.5" xmlns:xsi="http://www.w3.org/2001/XMLSchema-instance" xsi:type="JMFRootMessage">
    <Command ID="m.587730553._000010" SenderID="Finisher" Type="PipePush" xsi:type="CommandPipePush">
        <PipeParams JobID="J1" PipeID="PipeSheet">
            <AmountPool>
                <PartAmount>
                    <Part SetIndex="34--1"/>  ~62021
                </PartAmount>
            </AmountPool>
        </PipeParams>
    </Command>
</JMF>
```

6203

```
<JMF xmlns="http://www.CIP4.org/JDFSchema_1_1" MaxVersion="1.5" SenderID="Printer" TimeStamp="2013-09-18T10:58:27+02:00"
Version="1.5" xmlns:xsi="http://www.w3.org/2001/XMLSchema-instance" xsi:type="JMFRootMessage">
    <Command ID="m.1349935098._000011" Type="PipePush" xsi:type="CommandPipePush">
        <PipeParams JobID="J1" PipeID="PipeSheet">
            <AmountPool>
                <PartAmount Amount="1">
                    <Part DocTags="Cover" SetIndex="34"/>  ~62031
                </PartAmount>
                <PartAmount ActualAmount="1">
                    <Part DocTags="Cover" SetIndex="34" SheetIndex="0"/>
                </PartAmount>
            </AmountPool>
        </PipeParams>
    </Command>
</JMF>
```

FIG.6C

```
6300
<JMF xmlns="http://www.CIP4.org/JDFSchema_1_1" MaxVersion="1.5" SenderID="TestSender" TimeStamp="2013-09-18T10:58:27+02:00"
Version="1.5" xmlns:xsi="http://www.w3.org/2001/XMLSchema-instance" xsi:type="JMFRootMessage">
    <Command ID="m.587730553._000010" SenderID="Finisher" Type="PipePull" xsi:type="CommandPipePull">
        <PipeParams JobID="J1" PipeID="PipeSheet">                                               ~63001
            <AmountPool>
                <PartAmount>
                    <Part SetIndex="34~1"/> ~63002
                </PartAmount>
            </AmountPool>
        </PipeParams>
    </Command>
</JMF>
```

<JMF xmlns="http://www.CIP4.org/JDFSchema_1_1" MaxVersion="1.5" SenderID="Printer" TimeStamp="2013-09-18T10:58:27+02:00"
Version="1.5" xmlns:xsi="http://www.w3.org/2001/XMLSchema-instance" xsi:type="JMFRootMessage">
    <Command ID="m.1349935098._000017" Type="PipeClose" xsi:type="CommandPipeClose">     ──64001
        <PipeParams JobID="J1" PipeID="PipeSheet">──64002
            <AmountPool>
                <PartAmount>
                    <Part SetIndex="0~221"/>
                </PartAmount>
            </AmountPool>
        </PipeParams>
    </Command>
</JMF>
```

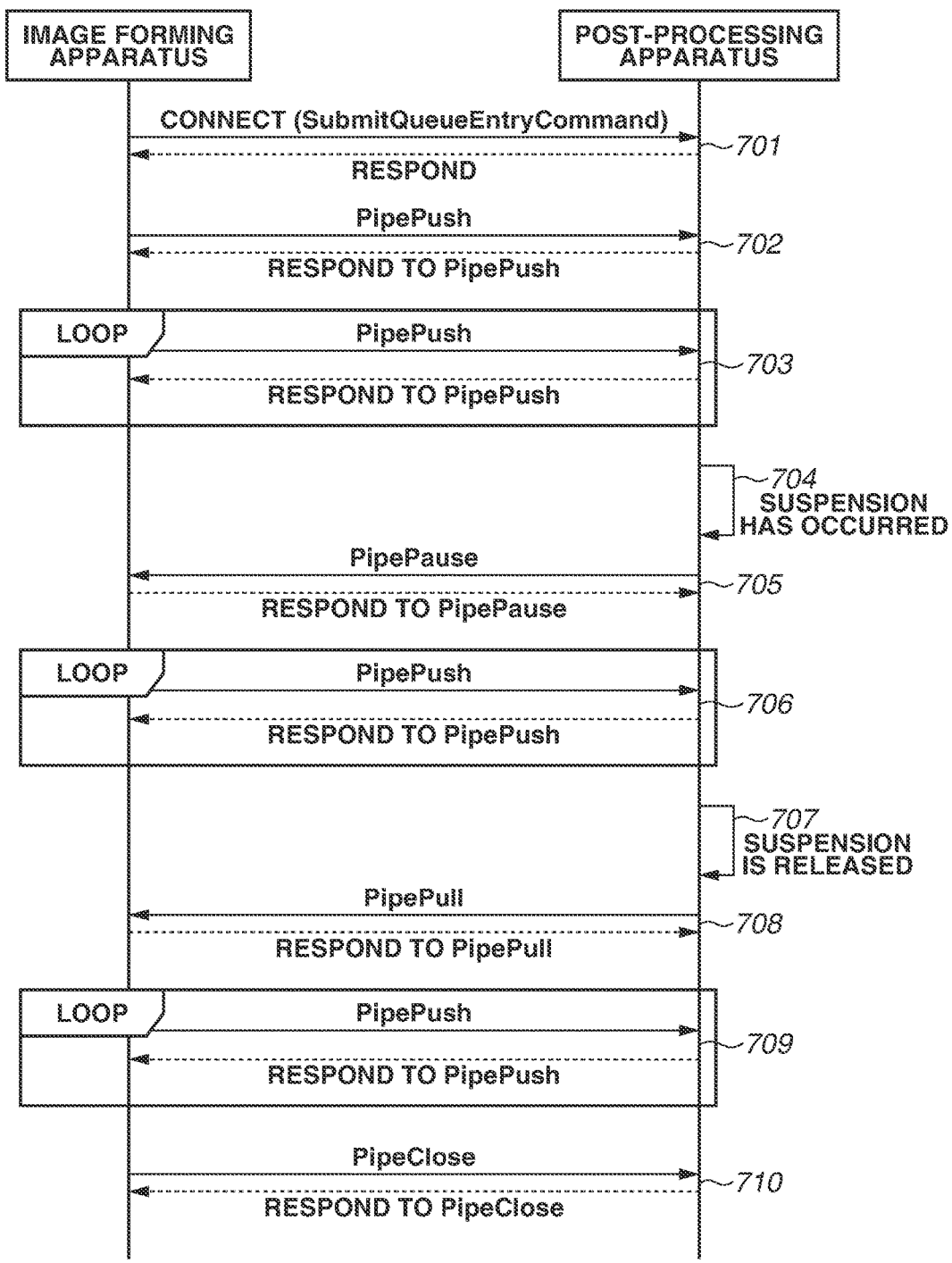

FIG.12A

| CONTENT OF TEMPORARY STOP REASON | TIME | UNIT |
|---|---|---|
| DoorOpen | 90 | SECOND |
| PaperJam | 5 | MINUTE |
| ObliqueSheet | 3 | MINUTE |
| BadFeed | 6 | MINUTE |
| OutputAreaFull | 5 | MINUTE |
| WasteFull | 10 | MINUTE |

FIG.12B

| APPARATUS | TIME | UNIT |
|---|---|---|
| POST-PROCESSING APPARATUS 102 | 90 | SECOND |
| POST-PROCESSING APPARATUS 103 | 30 | MINUTE |
| POST-PROCESSING APPARATUS 104 | 50 | MINUTE |
| POST-PROCESSING APPARATUS 105 | 90 | MINUTE |

FIG.12C

| JOB ID | JOB NAME | QUEUE | STATE | RECEPTION OF TEMPORARY STOP COMMAND | TEMPORARY STOP REASON |
|---|---|---|---|---|---|
| 001 | J1 | PRINT QUEUE | TEMPORARILY STOPPED | RECEIVED | DoorOpen |
| 002 | J2 | PRINT QUEUE | WAITING | NOT RECEIVED | — |
| 003 | J3 | PRINT QUEUE | WAITING | NOT RECEIVED | — |
| 004 | J4 | PRINT QUEUE | WAITING | NOT RECEIVED | — |
| 005 | J5 | HOLD QUEUE | WAITING | NOT RECEIVED | — |

```
<JDF ID="n_000004" JobID="J1" JobPartID="n_000002_1" MaxVersion="1.4" Status="Waiting" Type="Combined" Types="DigitalPrinting"
Version="1.4" xmlns="http://www.CIP4.org/JDFSchema_1_1"
xmlns:xsi="http://www.w3.org/2001/XMLSchema-instance" xsi:type="Combined">
    <AuditPool>
        <Created AgentName="CIP4 JDF Writer Java" AgentVersion="1.4a BLD 74" ID="a_000005" TimeStamp="2013-09-19T15:36:28+02:00"/>
    </AuditPool>
    <ResourcePool>
        <RunList Automation="Dynamic" Class="Parameter" ID="r_000006" Status="Available"/>
        <DigitalPrintingParams Class="Parameter" ID="r_000007" Status="Available"/>
        <Component Automation="Dynamic" Class="Quantity" ComponentType="PartialProduct Sheet" ID="r_000008" PartIDKeys="SetIndex
DocTags" PipeID="PipeSheet" PipeProtocol="JMFPush" Status="Unavailable" PipePause="100.0" PipeResume="10.0">
            <Component SetIndex="0~1">
                <Component DocTags="Cover" SurfaceCount="2"/>
                <Component DocTags="Body" SurfaceCount="-1"/>
            </Component>
        </Component>
    </ResourcePool>
    <ResourceLinkPool>
        <RunListLink CombinedProcessIndex="0" Usage="Input" rRef="r_000006"/>
        <DigitalPrintingParamsLink CombinedProcessIndex="0" Usage="Input" rRef="r_000007"/>
        <ComponentLink Amount="1" CombinedProcessIndex="0" Usage="Output" rRef="r_000008">
            <Component SetIndex="0~1">
        </ComponentLink>
    </ResourceLinkPool>
</JDF>
```

FIG.13B

```
1600
<JDF ID="n_000009" JobID="J1" JobPartID="n_000002.2" MaxVersion="1.4" Status="Waiting" Type="Combined" Types="Collecting Stitching" Version="1.4"
xmlns="http://www.CIP4.org/JDFSchema_1_1" xmlns:xsi="http://www.w3.org/2001/XMLSchema-instance" xsi:type="Combined">
    <AuditPool>
        <Created AgentName="CIP4 JDF Writer Java" AgentVersion="1.4a BLD 74" ID="a_000010" TimeStamp="2013-09-19T15:36:28+02:00"/>
    </AuditPool>
    <ResourceLinkPool>
        <ComponentLink ProcessUsage="Cover" Usage="Input" rRef="r_000008">
            <Part DocTags="Cover" SetIndex="0~-1"/>
        </ComponentLink>
        <ComponentLink CombinedProcessIndex="0" Usage="Input" rRef="r_000008">
            <Part DocTags="Body" SetIndex="0~-1"/>
        </ComponentLink>
        <StitchingParamsLink CombinedProcessIndex="1" Usage="Input" rRef="r_000011"/>
        <ComponentLink Amount="1" CombinedProcessIndex="1" Usage="Output" rRef="r_000012"/>
    </ResourceLinkPool>
    <ResourcePool>
        <StitchingParams Class="Parameter" ID="r_000011" Status="Available"/>
        <Component Class="Quantity" ComponentType="FinalProduct Black" ID="r_000012" Status="Unavailable"/>
        <Component Automation="Dynamic" Class="Quantity" ComponentType="PartialProduct Sheet" ID="r_000008" PartIDKeys="SetIndex DocTags"
PipeID="PipeSheet" PipeProtocol="JMFPush" Status="Unavailable" PipePause="100.0" PipeResume="10.0" PipeURL="192.22.22.22">
            <Component SetIndex="0~-1">    ← 1603
1601        <Component DocTags="Cover" SurfaceCount="2"/>   1604    1605    1602
            <Component DocTags="Body" SurfaceCount="-1"/>
            </Component>
        </Component>
    </ResourcePool>
</JDF>
```

SYSTEM, PRINTING APPARATUS AND METHOD FOR CONTROLLING THE SAME, AND POST-PROCESSING APPARATUS AND METHOD FOR CONTROLLING THE SAME

BACKGROUND OF THE INVENTION

Field of the Invention

The present disclosure relates to a technique for producing a product by performing post-processing on a print product output from an image forming apparatus with use of a post-processing apparatus.

Description of the Related Art

Conventionally, in the commercial printing industry, various products have been produced by combining an image forming apparatus and a post-processing apparatus. For example, an advanced product can be produced by setting a print product on the post-processing apparatus after the image forming apparatus performs print processing to output the print product, and performing post-processing (after processing), such as bookbinding and cutting, thereon.

In such a configuration, the print processing by the image forming apparatus and the post-processing by the post-processing apparatus may be performed in parallel with each other to improve productivity associated with the production. More specifically, while the print product is output from the image forming apparatus, this print product is transferred to the post-processing apparatus by being manually carried or via a conveyor belt. The post-processing apparatus produces the product by performing the post-processing on the received print product as needed.

For example, Japanese Patent Application Laid-Open No. 2008-110576 discusses a technique for causing the image forming apparatus to receive an instruction to stop the printing via a user interface, and stop the print processing currently in progress.

However, although the technique discussed in Japanese Patent Application Laid-Open No. 2008-110576 allows the image forming apparatus to stop the printing via the user interface of the image forming apparatus, this technique does not include consideration of stopping the printing from the post-processing apparatus that performs the post-processing on the product printed by the image forming apparatus. Therefore, for example, even when the post-processing apparatus side cannot perform the post-processing and it is desired to stop the print processing performed by the image forming apparatus, the print processing cannot be stopped. Further, in a case where the print processing performed by the image forming apparatus is temporarily stopped according to an instruction from the post-processing apparatus, and if the post-processing apparatus transmits only the temporary stop instruction, the image forming apparatus cannot recognize a status of the post-processing apparatus and timing of when to resume the print processing, which results in deterioration in productivity of the entire system.

SUMMARY OF THE INVENTION

The present disclosure has been made at least in part in consideration of the above-described issue, and is directed to providing a technique capable of reducing the deterioration in the productivity of the entire system even when the print processing performed by the image forming apparatus is temporarily stopped, according to the instruction from the post-processing apparatus that performs the post-processing on the product printed by the image forming apparatus.

According to an aspect of the present disclosure, a system includes a printing apparatus, and a post-processing apparatus, wherein the post-processing apparatus includes: a post-processing unit configured to perform post-processing on a product printed by the printing apparatus, and a transmission unit configured to transmit a command for a temporary stop of print processing for a first job and information indicating a reason for the temporary stop to the printing apparatus, and wherein the printing apparatus includes: a printing unit, a reception unit configured to receive the command for the temporary stop of the print processing for the first job and the information indicating the reason for the temporary stop from the post-processing apparatus, a stop unit configured to stop the print processing for the first job according to the command for the temporary stop, and an acquisition unit configured to acquire a period of time during which the temporary stop continues, based on the received information indicating the reason for the temporary stop.

According to other aspects of the present disclosure, one or more additional systems, one or more printing apparatuses, one or more methods for controlling same, one or more post-processing apparatuses, one or more methods for controlling same and one or more storage mediums are discussed herein. Further features of the present disclosure will become apparent from the following description of exemplary embodiments with reference to the attached drawings.

BRIEF DESCRIPTION OF THE DRAWINGS

FIG. 5 is a block diagram illustrating a software configuration of the image forming apparatus and a software configuration of the post-processing apparatus according to the present exemplary embodiment.

FIGS. 6A, 6B (consisting of FIGS. 6B1 and 6B2), 6C, and 6D are diagrams illustrating examples of commands (messages) generated by the information processing system according to the present exemplary embodiment.

FIG. 7 is an example of a sequence diagram illustrating communication processing in the information processing system according to the present exemplary embodiment.

FIGS. 12A, 12B, and 12C are diagrams each illustrating an example of information held by the image forming apparatus according to the present exemplary embodiment.

FIGS. 13A and 13B are diagrams each illustrating an example of a job ticket according to the present exemplary embodiment.

DESCRIPTION OF THE EMBODIMENTS

In the following description, an exemplary embodiment for the present disclosure will be described with reference to the drawings.

Figure 1:
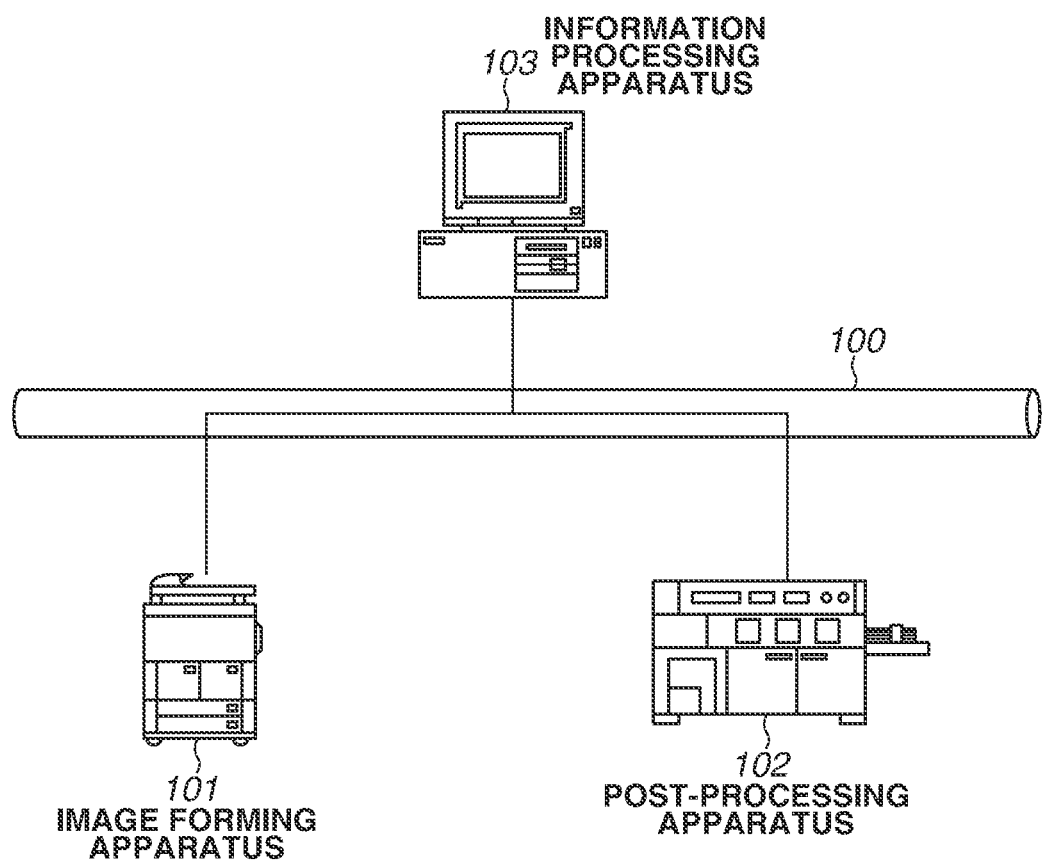
FIG. 1 illustrates a system configuration of an information processing system according to an exemplary embodiment of the present disclosure.

FIG. 1 illustrates an overall configuration of an information processing system according to the exemplary embodiment of the present disclosure. An environment of the entire information processing system, which will be described in the following description, is merely an example for facilitating understanding of the present disclosure, and the present disclosure is not limited to this environment.

In FIG. 1, an image forming apparatus 101, a post-processing apparatus 102, and an information processing apparatus 103 are connected to a network 100. The image forming apparatus 101 analyzes print data including print character data transmitted from the information processing apparatus 103 or the like, converts the print data into a dot image page by page, and prints the print data. Further, the image forming apparatus 101 communicates with the post-processing apparatus 102 via the network 100 to transmit and receive control information and the like thereto and therefrom. A print product output from the image forming apparatus 101 is transferred to the post-processing apparatus 102 by being carried manually by a print operator, or is transferred to the post-processing apparatus 102 via a not-illustrated conveyor belt. The post-processing apparatus 102 performs post-processing (after processing), such as cutting, bookbinding, and folding, on the print product output from the image forming apparatus 101. The post-processing apparatus 102 is a post-processing apparatus capable of communicating with the image forming apparatus 101 and the information processing apparatus 103 via the network 100. A program such as a workflow management program and a web server runs on the information processing apparatus 103. Further, a printer driver program or the like, which is used for connecting the image forming apparatus 101 with the post-processing apparatus 102 via the network 100 and controlling the image forming apparatus 101, is installed in the information processing apparatus 103. FIG. 1 illustrates the information processing system as including a signal apparatus as each of the image forming apparatus 101, the post-processing apparatus 102, and the information processing apparatus 103, but the information processing system may include a plurality of apparatuses as each of them. Alternatively, the information processing system may not include the information processing apparatus 103. Further, the network 100 may be the Internet, and for example, the information processing system may be configured in such a manner that the information processing apparatus 103 has Internet access to the image forming apparatus 101 and the post-processing apparatus 102. The image forming apparatus 101 is a printing apparatus, and the post-processing apparatus 102 is a print product processing apparatus.

Figure 2:
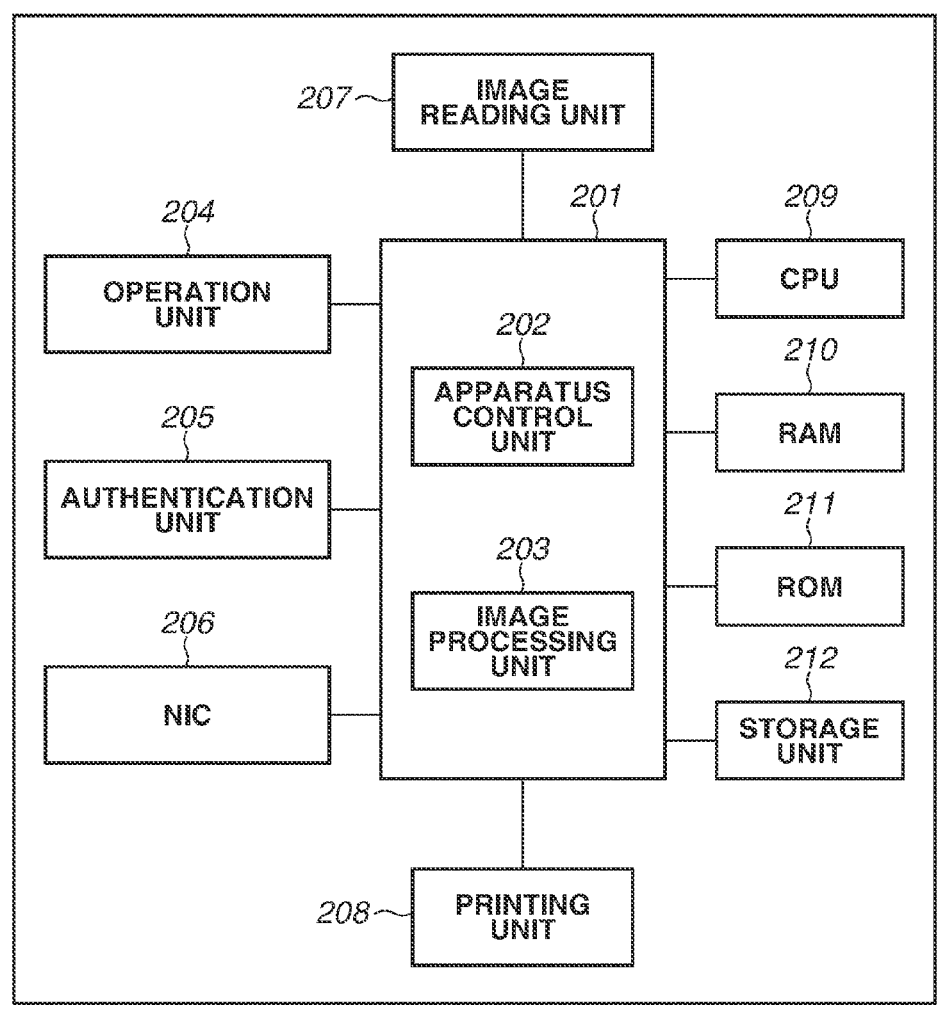
FIG. 2 is a block diagram illustrating a hardware configuration of an image forming apparatus according to the present exemplary embodiment.

FIG. 2 illustrates a hardware configuration of the image forming apparatus 101 according to the present exemplary embodiment. The image forming apparatus 101 includes an operation unit 204, an authentication unit 205, a network interface card (NIC) 206, a central processing unit (CPU) 209, a random access memory (RAM) 210, a read only memory (ROM) 211, a storage unit 212, an image reading unit 207, and a printing unit 208, which are connected to one another via a control unit 201. The control unit 201 includes an apparatus control unit 202, which controls the entire image forming apparatus 101, and an image processing unit 203, which processes image data. The operation unit 204 includes, for example, a software keyboard, a touch panel, and/or another input/output device, and can input and display various kinds of setting values. The CPU 209 executes a program stored in the ROM 211, and a program loaded from the storage unit 212 into the RAM 210, such as an application. In other words, the CPU 209 functions as each of processing units for performing processing illustrated in each of flowcharts that will be described below, by executing the program stored in a readable storage medium. The RAM 210 is a main memory of the CPU 209, and functions as a work area and the like. The image reading unit 207 includes, for example, a scanner, and can acquire a document image in an image data format (for example, the Joint Photographic Experts Group (JPEG) format or the bitmap format) by reading a paper document or the like. The control unit 201 performs processing for providing a document image stored in the storage unit 212 to the operation unit 204 to output the document image onto the operation unit 204. Further, similarly, the control unit 201 provides the document image stored in the storage unit 212 to the printing unit 208, and the printing unit 208 performs processing for outputting the document image in various forms. For example, the printing unit 208 can perform processing for outputting the document image into a storage medium. Alternatively, the printing unit 208 may perform processing for outputting the document image onto an output medium such as a paper medium, as the printing unit 208 has a printing function. Further, the image forming apparatus 101 is capable of connecting to the network 100 via the NIC 206, and transmitting and receiving data. The data acquired via the NIC 206 can also be displayed on the operation unit 204.

Figure 3:
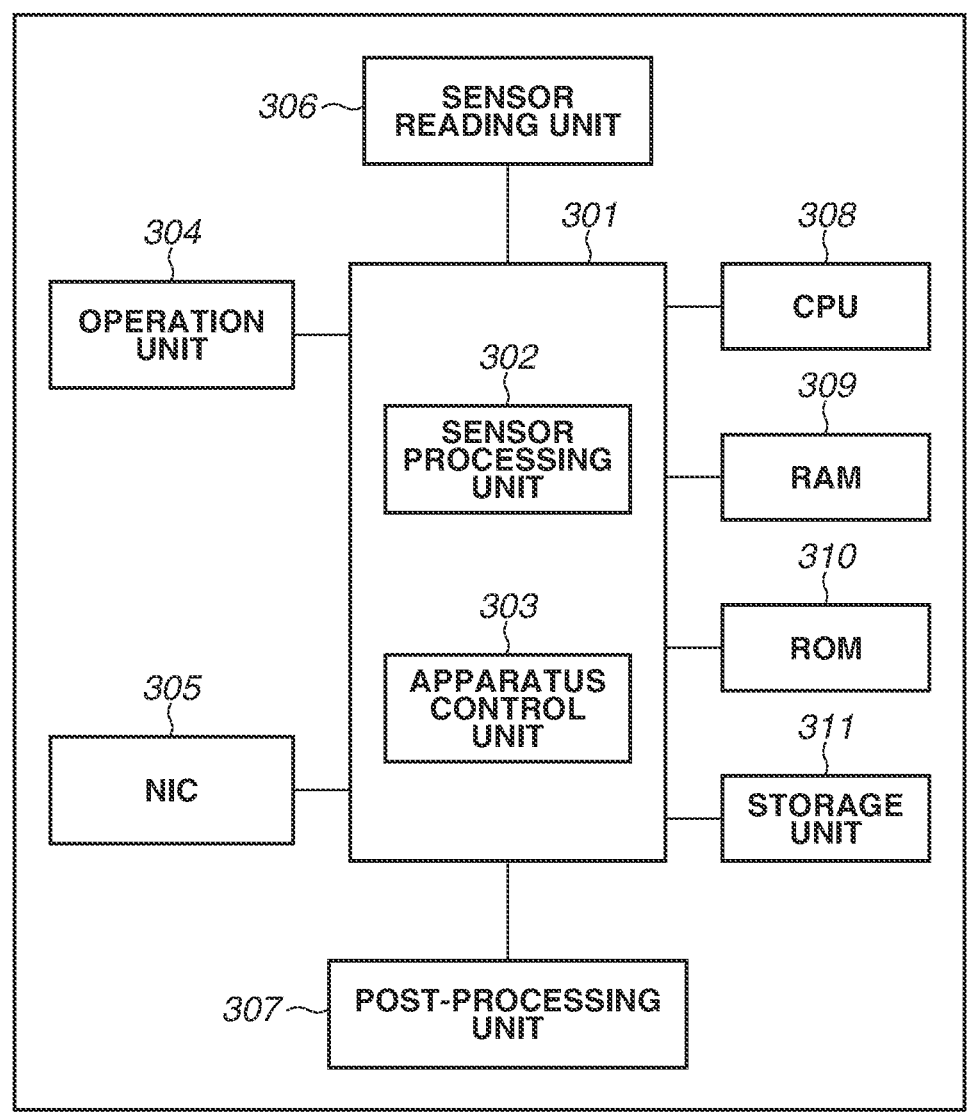
FIG. 3 is a block diagram illustrating a hardware configuration of a post-processing apparatus according to the present exemplary embodiment.

FIG. 3 illustrates a hardware configuration of the post-processing apparatus 102 according to the present exemplary embodiment. The post-processing apparatus 102 includes an operation unit 304, an NIC 305, a CPU 308, a RAM 309, a ROM 310, a storage unit 311, a sensor reading unit 306, and a post-processing unit 307, which are connected to one another via a control unit 301. The control unit 301 includes a sensor processing unit 302, which processes sensor information read by the sensor reading unit 306, and an apparatus control unit 303, which controls the entire post-processing apparatus 102. The operation unit 304 includes, for example, a software keyboard, a touch panel, and/or another input/output device, and can input and display various kinds of setting values. The CPU 308 executes a program stored in the ROM 310, and a program loaded from the storage unit 311 into the RAM 309, such as an application. In other words, the CPU 308 functions as each of processing units for performing the processing illustrated in each of the flowcharts that will be described below, by executing the program stored in a readable storage medium. The RAM 309 is a main memory of the CPU 308, and functions as a work area and the like. The sensor reading unit 306 can read job information (for example, for checking a combination of a front cover and a body of a case binding job) of the print product that is a post-processing target, and the like via a device such as a camera. The control unit 301 performs processing for providing post-processing information stored in the storage unit 311 to the operation unit 304 to output information indicating a setting of the post-processing onto the operation unit 304. Further, similarly, the control unit 301 provides the post-processing information stored in the storage unit 311 to the post-processing unit 307, and the post-processing unit 307 performs the post-processing in various forms. Further, the post-processing apparatus 102 is capable of connecting to the network 100 via the NIC 305, and transmitting and receiving data. The data acquired via the NIC 305 can also be displayed on the operation unit 304. Further, the post-processing apparatus 102 includes a receiver unit (not illustrated) that receives the product printed by the image forming apparatus 101.

Figure 4:
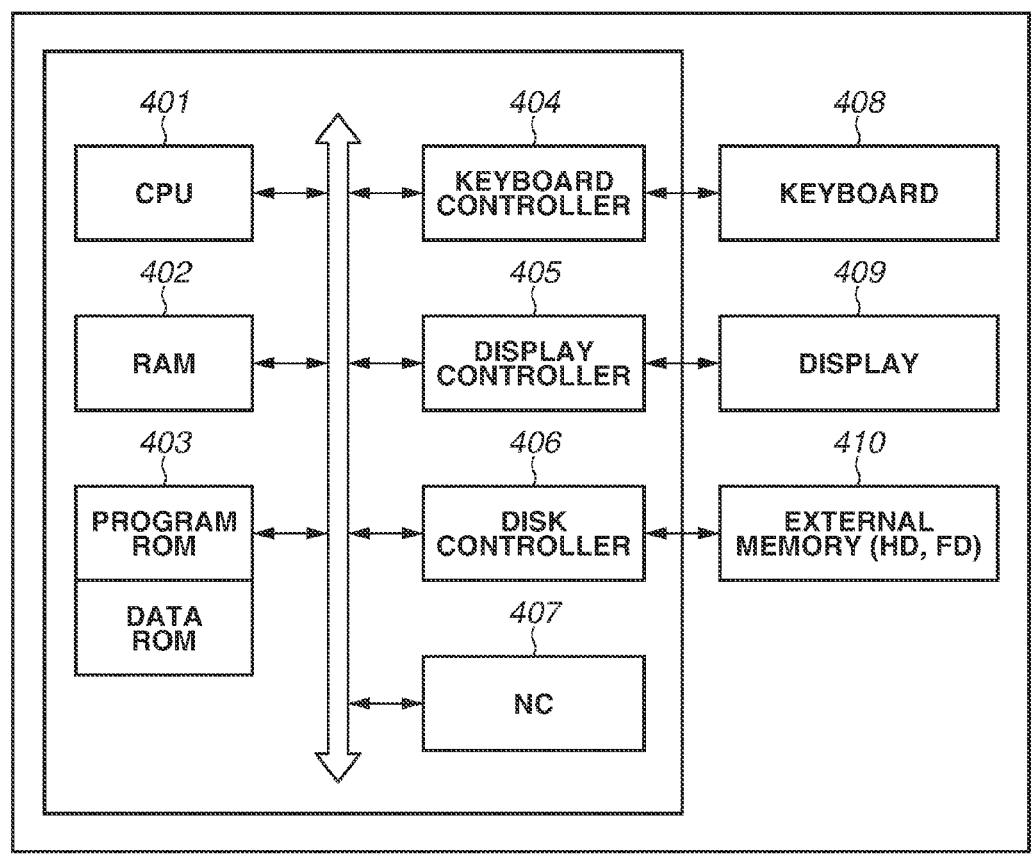
FIG. 4 is a block diagram illustrating a hardware configuration of an information processing apparatus according to the present exemplary embodiment.

FIG. 4 illustrates a hardware configuration of the information processing apparatus 103 according to the present exemplary embodiment. The information processing apparatus 103 can be constructed with use of hardware of a commonly-used computer (a personal computer (PC)). In FIG. 4, a CPU 401 executes a program stored in a program ROM in a ROM 403, and a program loaded from an external memory 410 into a RAM 402, such as an operating system (OS) and an application.

In other words, the CPU 401 functions as each of processing units for performing the processing illustrated in each of the flowcharts that will be described below, by executing this program stored in a readable storage medium. The RAM 402 is a main memory of the CPU 401, and functions as a work area and the like. A keyboard controller 404 controls an operation input from a keyboard 408 or a not-illustrated pointing device (a mouse, a touch pad, a touch panel, a trackball, or the like). A display controller 405 controls what is displayed on a display 409. A disk controller 406 controls data access to the external memory 410 storing various kinds of data, such as a hard disk (HD) and a flexible disk (FD). A network controller (NC) 407 is connected to the network 100, and performs processing for controlling communication with another apparatus connected to the network 100.

FIG. 5 is a functional block diagram illustrating each of functions of the image forming apparatus 101 and the post-processing apparatus 102 in the information processing system according to the present exemplary embodiment. The present exemplary embodiment will be described based on an example in which the image forming apparatus 101 and the post-processing apparatus 102 communicate with each other with use of commands (messages) illustrated in FIGS. 6A to 6D. Therefore, the functional block diagrams of the image forming apparatus 101 and the post-processing apparatus 102 will be described now.

A function of each of the processing units of the image forming apparatus 101 will be described. A device control unit 5101 controls an image forming unit 5112 according to a print instruction from a job control unit 5102. The job control unit 5102 performs control regarding processing a print job. More specifically, the job control unit 5102 instructs the device control unit 5101 regarding the print processing and transmits a command regarding the post-processing to the post-processing apparatus 102 based on print job information stored in a job information storage unit 5107 and a command received from the post-processing apparatus 102. A command analysis unit 5103 analyzes a command (a command, such as the commands illustrated in FIGS. 6A to 6D, which will be described below) received from the post-processing apparatus 102 or the information processing apparatus 103. A command generation unit 5104 generates a command (a command, such as the commands illustrated in FIGS. 6A to 6D, which will be described below) to be transmitted to the post-processing apparatus 102 or the information processing apparatus 103. A communication processing unit 5105 carries out data communication with the post-processing apparatus 102 and the information processing apparatus 103. A job information management unit 5106 manages the print job information stored in the job information storage unit 5107. The job information storage unit 5107 stores the information regarding the print job, based on which the image forming apparatus 101 performs the print processing. FIG. 12C illustrates an example of the information stored in the job information storage unit 5107, and illustrates a list 1700 of jobs held by the image forming apparatus 101. The list 1700 includes a job identification (ID) 1701, a job name 1702, queue information 1703 indicating whether the job is placed in a Print queue or a Hold queue, a state 1704 indicating whether the job is in process, waiting, or the like, information 1705 indicating whether a temporary stop command has been received, and a temporary stop reason 1706. The image forming unit 5112 is a processing mechanism that performs the print processing. A reason determination unit 5108 acquires a temporary stop reason written in the temporary stop command in a case where the command received from the post-processing apparatus 102 is the temporary stop command. An acquisition unit 5110 acquires a temporary stop time based on a content of the temporary stop reason or the type of the post-processing apparatus.

The acquisition of the temporary stop time based on the content of the temporary stop reason will be described. The temporary stop time is acquired based on the content of the temporary stop reason with use of a list 1200 illustrated in FIG. 12A. FIG. 12A illustrates the list 1200 in which the content of the temporary stop reason and the temporary stop time are associated with each other. The list 1200 is held by a holding unit of the image forming apparatus 101. A column 1201 stores the content of the temporary stop reason. A value registered with the column 1201 is the same as a value written as the temporary stop reason in the temporary stop command. A column 1202 indicates the temporary stop time. A column 1203 indicates a unit of a numerical value registered with the column 1202. A value that can be registered with the column 1203 is any of "day", "hour", "minute", and "second". In the column 1201, "DoorOpen" means that a door attached to the post-processing apparatus is opened, and "PaperJam" means a paper jam. "ObliqueSheet" means that paper is conveyed obliquely. "BadFeed" means that the paper is incorrectly fed at a feeder. "OutputAreaFull" means that an area where the product is output is filled up, and "WasteFull" means that an area where waste is collected is filled up.

A method for acquiring the temporary stop time based on the type of the post-processing apparatus will be described. The temporary stop time is acquired based on the type of the post-processing apparatus with use of a list 1300 illustrated in FIG. 12B. FIG. 12B illustrates the list 1300 indicating the post-processing apparatus and a processing time required for this post-processing apparatus to process one resource. This list 1300 is held by the holding unit of the image forming apparatus 101. Columns 1301, 1302, and 1303 indicate a name of the post-processing apparatus, the processing time required for processing one resource, and a unit of the time, respectively. For example, in a case where the name of the post-processing apparatus is the post-processing apparatus 102, the time required to process one resource is ninety seconds.

A reprinting determination unit 5111 acquires a device ID written in the command received from the post-processing apparatus 102. More specifically, the reprinting determination unit 5111 acquires a value from a DeviceID attribute in a Pause command illustrated in FIG. 6A. Then, the reprinting determination unit 5111 determines the type of the device, such as a case binding apparatus, a cutting apparatus, and a folding apparatus, according to a device ID, and further refers to the content of the temporary stop reason together therewith, thereby determining whether reprinting is necessary. For example, in a case where the type of the post-processing apparatus 102 is the case binding apparatus and the content of the temporary stop reason is double feed of paper, the paper can be reused by being removing from the case binding apparatus, so that the reprinting determination unit 5111 determines that the reprinting is unnecessary. Conversely, in a case where the type of the post-processing apparatus 102 is the cutting apparatus and the content of the temporary stop reason is the double feed of paper, the paper is already cut, so that the reprinting determination unit 5111 determines that the reprinting is necessary.

A function of each of the processing units of the post-processing apparatus 102 will be described. A communication processing unit 5201 carries out data communication with the image forming apparatus 101 and the information processing apparatus 103. A command analysis unit 5202 analyzes a command (a command such as the commands illustrated in FIGS. 6A to 6D, which will be described below) received from the image forming apparatus 101 or the information processing apparatus 103. A command generation unit 5203 generates a command (a command such as the commands illustrated in FIGS. 6A to 6D, which will be described below) to be transmitted to the image forming apparatus 101 or the information processing apparatus 103. A job control unit 5204 performs control regarding processing a post-processing job for which the post-processing apparatus 102 performs the post-processing. More specifically, the job control unit 5204 issues an instruction regarding the post-processing to a device control unit 5205 and transmits a command regarding the print processing to the image forming apparatus 101, based on information about the post-processing job stored in a job information storage unit 5206 and the command received from the image forming apparatus 101. The device control unit 5205 controls a post-processing unit 5208 according to the post-processing instruction from the job control unit 5204. The job information storage unit 5206 stores the information regarding the post-processing job, based on which the post-processing apparatus 102 performs the post-processing. The information about the post-processing job also includes instruction information indicating what kind of post-processing should be performed for each job. For example, if the post-processing is set for the case binding, the information about the post-processing job includes information such as sheet sizes, sheet types, and finishing sizes of the front cover and the body. These pieces of information are received from the information processing apparatus 103 or the like in advance, or input by the operator from the operation unit 304 of the post-processing apparatus 102. A job information management unit 5207 manages the information about the post-processing job stored in the job information storage unit 5206. The post-processing unit 5208 is a processing mechanism that performs the post-processing.

A detection unit 5209 detects a cause for which the processing in progress is suspended at the post-processing apparatus 102. A receiving unit 5210 receives an input of a command for temporarily stopping processing performed by a communication partner from an operation panel (the operation unit 304), which will be described below.

FIGS. 6A to 6D are diagrams illustrating examples of formats of the commands (the messages) generated by the command generation unit 5104 of the image forming apparatus 101 and the command generation unit 5203 of the post-processing apparatus 102 in the information processing system according to the present exemplary embodiment. A sequence indicating an exchange of the commands will be described with reference to FIG. 7.

FIG. 6B illustrates commands used for an apparatus to notify the communication partner that the apparatus starts the processing of this apparatus itself, notify the communication partner that the apparatus has started the processing of this apparatus itself, or confirm resuming of the processing of this apparatus itself to the communication partner. In the present exemplary embodiment, these commands will be collectively referred to as an output notification command or a "Push" command. For example, the image forming apparatus 101 can instruct the post-processing apparatus 102 to perform the post-processing on the print product output from the image forming apparatus 101 by transmitting the output notification command to the post-processing apparatus 102.

A command 6200 is an example of the output notification command that is transmitted from the image forming apparatus 101 to the post-processing apparatus 102 for starting communication. Type="PipePush" is written and xsi:type="CommandPipePush" is further written in a portion 62001, which make the command 6200 the output notification command. The command 6200 specifies an identification (ID) of the communication (Pipe) by PipeID="PipeSheet" in a PipeParams element in a portion 62002. However, "PipeSheet" is an example of PipeID, and the ID may be assigned in any manner. The use of PipeID allows the command to be identified as to which communication this command is associated with. After the communication is started, this output notification command is transmitted to the post-processing apparatus 102 every time the image forming apparatus 101 outputs the resource (for example, the print product) to the post-processing apparatus 102.

A command 6201 is an example of the output notification command for notifying the post-processing apparatus 102 that the image forming apparatus 101 has output the resource (for example, the print product). A portion 62011 notifies the post-processing apparatus 102 that the image forming apparatus 101 has output one copy of a body of a thirty-fifth set among seven copies.

A command 6202 is an example of the output notification command that is transmitted from the image forming apparatus 101 to the post-processing apparatus 102 for confirming whether the image forming apparatus 101 is permitted to resume temporarily stopped processing to the post-processing apparatus 102. In a portion 62021, SetIndex="34~-1" is specified in a Part element, by which the command 6202 confirms whether the image forming apparatus 101 is permitted to resume the processing from a thirty-fourth set. In the present example, "–1" means execution of the processing to the last.

A command 6203 is the output notification command for notifying the post-processing apparatus 102 that the image forming apparatus 101 has output the resource (for example, the print product) after resuming the temporarily stopped processing. A portion 62031 indicates that the image forming apparatus 101 has resumed the processing from the thirty-fourth set. The output notification command is transmitted to the post-processing apparatus 102 every time the image forming apparatus 101 outputs the resource.

FIG. 6A illustrates commands for temporarily stopping the processing performed by the communication partner. In the present exemplary embodiment, such commands will be referred to as the temporary stop command or a "Pause" command. For example, the post-processing apparatus 102 can instruct the image forming apparatus 101 to stop the print processing by transmitting this command (the "Pause" command) to the image forming apparatus 101. In the present exemplary embodiment, the "Pause" command will be described based on the example in which the post-processing apparatus 102 transmits this command (the "Pause" command) to the image forming apparatus 101.

A command 6100 is the temporary stop command that is transmitted from the post-processing apparatus 102 to the image forming apparatus 101 in a case where it is desired to temporarily stop the processing performed by the image forming apparatus 101 because a paper jam has occurred at the post-processing apparatus 102 and the post-processing apparatus 102 cannot perform the post-processing. In the present exemplary embodiment, the command 6100 will be described based on an example in which information indicating a reason why the processing has been temporarily stopped is transmitted together with the temporary stop command to the communication partner. Type="PipePause" is written and xsi:type="CommandPipePause" is further written in a portion 61001, which make the command 6100 the temporary stop command. A PipeParams element in a portion 61002 is a parameter in which an instruction to the communication partner is written. Reason="Error" is written, by which the command 6100 can indicate that a suspension influential to the system has occurred. StatusDetails="PaperJam" is written, by which the command 6100 can indicate that the paper jam has occurred at the post-processing apparatus 102. Condition="Waste" and SetIndex="34 35" in a Part element in a portion 61003 notify the image forming apparatus 101 that spoilage is generated at the thirty-fourth set and the thirty-fifth set at the post-processing apparatus 102 due to the occurrence of the paper jam. The spoilage means the print product that becomes unusable as a product.

A command 6101 is the temporary stop command that is transmitted from the post-processing apparatus 102 to the image forming apparatus 101 in a case where the door of the post-processing apparatus 102 is opened at the post-processing apparatus 102. Reason="Warning" is written in a PipeParams element in a portion 61004, by which the command 6101 indicates that a suspension uninfluential to the system has occurred. StatusDetails="DoorOpen" is written, by which the command 6101 indicates that the door of the post-processing apparatus 102 is opened.

A command 6102 is the temporary stop command that is transmitted from the post-processing apparatus 102 to the image forming apparatus 101 in a case where the number of resources exceeds a predetermined value at the post-processing apparatus 102. The exceedance of the number of resources over the predetermined value means that, for example, resources (print products) are transferred from the image forming apparatus 101 via the conveyor belt or the like, and the number of resources still unprocessed by the post-processing apparatus 102 exceeds the predetermined value, which leads to trouble in the processing at the post-processing apparatus 102. In other words, this exceedance indicates that the post-processing apparatus 102 has more resources to process than the post-processing apparatus 102 can handle right now. Reason="ExceededIntendedQuantity" is written in a PipeParams element in a portion 61005, by which the command 6102 can indicate that the temporary stop has occurred due to the exceedance of the number of resources over the predetermined value. The predetermined value can be expressed by being written in a PipePause attribute and a PipeResume attribute in a Component element in any of a job ticket for the printing and a job ticket for the post-processing that are respectively illustrated in FIGS. 13A and 13B. The PipePause attribute indicates the predetermined value. In a case where a quantity of produced resources reaches the value written in the PipePause attribute, the temporary stop command is transmitted to the communication partner (for example, the post-processing apparatus 102 transmits the temporary stop command when the image forming apparatus 101 has produced one hundred sets of resources).

FIG. 6C illustrates a command for instructing the communication partner to perform the processing (for example, produce the product). In the present exemplary embodiment, this command will be referred to as an output request command or a "Pull" command. For example, the post-processing apparatus 102 can instruct the image forming apparatus 101 to print the print data by transmitting the output request command to the image forming apparatus 101.

A command 6300 is an example of the output request command that is transmitted from the post-processing apparatus 102 to the image forming apparatus 101. Type="PipePull" is written and xsi:type="CommandPipePull" is further written in a portion 63001, which make the command 6300 the output request command. The command 6300 indicates an example in which the post-processing apparatus 102 instructs the image forming apparatus 101 to resume the processing temporarily stopped according to the command 6100 because the paper jam is resolved at the post-processing apparatus 102. Therefore, SetIndex="34~-1" is written in a Part element in a portion 63002, by which the command 6300 instructs the image forming apparatus 101 to resume the processing from the thirty-fourth set. In the present example, "−1" means the execution of the processing to the last.

FIG. 6D illustrates a command for notifying the communication partner of an end of the communication. In the present exemplary embodiment, this command will be referred to as an end command or a "Close" command. In the present exemplary embodiment, FIG. 6D illustrates an example in which the image forming apparatus 101 transmits this command to the post-processing apparatus 102. However, the post-processing apparatus 102 can also transmit this command to the image forming apparatus 101. A command 6400 is an example of the end command that is transmitted from the image forming apparatus 101 to the post-processing apparatus 102. Type="PipeClose" is written and xsi:type="CommandPipeClose" is further written in a portion 64001, which make the command 6400 the end command. A portion 64002 refers to PipeID="PipeSheet" in a PipeParams element, thereby indicating an end of the communication having PipeSheet as PipeID thereof.

Each of the commands (the messages) illustrated in FIGS. 6A to 6D is merely an example, and the commands may be written by a different method. Further, the image forming apparatus 101 and the post-processing apparatus 102 may exchange the commands therebetween with use of a command (message) other than the commands described herein. Further, the commands have been described assuming that they are exchanged between the image forming apparatus 101 and the post-processing apparatus 102, but these commands may be exchanged between the image forming apparatus 101 and another apparatus than the post-processing apparatus 102.

FIG. 7 is a sequence diagram illustrating an example of a flow of processing in which the image forming apparatus 101 and the post-processing apparatus 102 communicate with each other with use of the commands (the messages) illustrated in FIGS. 6A to 6D in the information processing system according to the present exemplary embodiment.

In FIG. 7, in step 701, the command generation unit 5104 of the image forming apparatus 101 generates a command (a connection command) for establishing a connection to the post-processing apparatus 102 supposed to perform the post-processing for a target job, and transmits the generated command via the communication processing unit 5105, when the image forming apparatus 101 starts the print processing. More specifically, the image forming apparatus 101 transmits the job ticket for the post-processing that is illustrated in FIG. 13B to the post-processing apparatus 102. The command generated and transmitted in step 701 triggers a start of the connection between the image forming apparatus 101 and the post-processing apparatus 102. Upon receiving the command, the command analysis unit 5202 of the post-processing apparatus 102 analyzes the received command, and transmits a result thereof (acceptance or rejection of the connection) to the image forming apparatus 101.

FIG. 13B illustrates the job ticket for the post-processing. The job ticket for the post-processing is a job ticket to be used for processing the job by the post-processing apparatus 102. PipeID="PipeSheet" (1601) is specified in a Component element illustrated in FIG. 13B, which leads to establishment of the communication having PipeSheet as the ID thereof. In other words, PipeID is written in the job ticket for the post-processing that is illustrated in FIG. 13B, which makes this job ticket the connection command to the post-processing apparatus 102. A Uniform Resource Locator (URL) (Uniform Resource Identifier) is written in a PipeURL attribute (1602) in the Component element illustrated in FIG. 13B, by which this job ticket can specify a connection destination of the communication. PipeProtocol="JMFPush" (1603) is specified in the Component element illustrated in FIG. 13B, by which this job ticket defines that the image forming apparatus 101 initializes the communication. The PipePause attribute (1604) and the PipeResume attribute (1605) can define predetermined values for determining whether to temporarily stop or resume the communication. When the number of resources reaches the value written in the PipePause attribute, the post-processing apparatus 102 transmits the temporary stop command (the "Pause" command) to the image forming apparatus 101. When the number of resources reaches the value written in the PipeResume attribute, the post-processing apparatus 102 transmits a processing resuming command (the "Pull" command) to the image forming apparatus 101.

FIG. 13A illustrates an example of the job ticket for the printing. The job ticket for the printing is a job ticket to be used for processing the job by the image forming apparatus 101. Print settings required when the image forming apparatus 101 prints the print data, such as a setting of double-sided printing, a setting of stapling, and sheet information, are written in the job ticket for the printing. Further, the job ticket for the printing that is illustrated in FIG. 13A may be generated by the job control unit 5102, based on print settings input on the operation unit 204 of the image forming apparatus 101. Alternatively, this job ticket may be generated by the information processing apparatus 103 and received by the image forming apparatus 101 via the communication processing unit 5105.

In step 702, the image forming apparatus 101 notifies the post-processing apparatus 102 of an output of the print product (that the resource is output) by transmitting the output notification command (the "Push" command) indicated by the command 6200 illustrated in FIG. 6B (consisting of FIGS. 6B1 and 6B2) to the post-processing apparatus 102. Upon receiving the command, the command analysis unit 5202 of the post-processing apparatus 102 analyzes the received command, and transmits a result thereof (acceptance or rejection) to the image forming apparatus 101.

In step 703, upon the start of the print processing at the image forming apparatus 101, the command generation unit 5104 generates the "Push" command (for example, the command 6201 illustrated in FIG. 6B) for each resource on which the post-processing apparatus 102 performs the post-processing, and transmits the generated "Push" command to the post-processing apparatus 102. The post-processing apparatus 102 performs the post-processing on the received resource. Upon receiving the command, the command analysis unit 5202 of the post-processing apparatus 102 analyzes the received command, and transmits a result thereof (acceptance or rejection) to the image forming apparatus 101. In step 703, as many "Push" commands as the resources are transmitted to the post-processing apparatus 102.

Step 704 indicates that a suspension of the processing has occurred at the post-processing apparatus 102. In step 705, the post-processing apparatus 102 generates the "Pause" command indicating the temporary stop of the print processing to the image forming apparatus 101 by the command generation unit 5203, and transmits the generated "Pause" command to the image forming apparatus 101. Examples of possible situations under which the image forming apparatus 101 is notified of this command include the following cases. The image forming apparatus 101 may be notified of this command because a buffer for the resource exceeds a predetermined value at the post-processing apparatus 102, or may be notified of this command because a device error has occurred at the post-processing apparatus 102. For example, the post-processing apparatus 102 transmits the command 6100 illustrated in FIG. 6A to the image forming apparatus 101. Upon receiving the command, the command analysis unit 5103 of the image forming apparatus 101 analyzes the received command, and transmits a result thereof (acceptance or rejection) to the post-processing apparatus 102.

In step 706, the image forming apparatus 101 transmits the command for confirming whether the image forming apparatus 101 is permitted to resume the processing to the post-processing apparatus 102 (the "Push" command). More specifically, the image forming apparatus 101 transmits the command 6202 illustrated in FIG. 6B to the post-processing apparatus 102. The command 6202 illustrated in FIG. 6B is the output notification command in a case where the image forming apparatus 101 has resumed the printing from the thirty-fourth set. In a case where the post-processing apparatus 102 is not yet ready for resuming the processing when receiving the output notification command, the post-processing apparatus 102 recognizes that the print processing has been resumed, and transmits the temporary stop command to the image forming apparatus 101. This mechanism allows the image forming apparatus 101 to confirm whether the image forming apparatus 101 is permitted to resume the processing to the post-processing apparatus 102. Upon receiving the command, the command analysis unit 5202 of the post-processing apparatus 102 analyzes the received command, and transmits a result thereof (acceptance or rejection) to the image forming apparatus 101.

Step 707 indicates that the suspension raised in step 704 is resolved at the post-processing apparatus 102. In step 708, the post-processing apparatus 102 transmits the output request command ("Pull") to the image forming apparatus 101. More specifically, the post-processing apparatus 102 transmits the command 6300 illustrated in FIG. 6C. Upon receiving the command, the command analysis unit 5103 of the image forming apparatus 101 analyzes the received command, and transmits a result thereof (acceptance or rejection) to the post-processing apparatus 102. In step 709, the image forming apparatus 101 transmits the output notification command ("Push") every time the image forming apparatus 101 outputs the resource to the post-processing apparatus 102. More specifically, the image forming apparatus 101 transmits the command 6203 illustrated in FIG. 6B to the post-processing apparatus 102. Upon receiving the command, the command analysis unit 5202 of the post-processing apparatus 102 analyzes the received command, and transmits a result thereof (acceptance or rejection) to the image forming apparatus 101. In step 710, the command generation unit 5104 generates the "Close" command, which indicates that the image forming apparatus 101 ends the current connection because having completed outputting all resources, and transmits the generated "Close" command to the post-processing apparatus 102. More specifically, the image forming apparatus 101 transmits the command 6400 illustrated in FIG. 6D to the post-processing apparatus 102. Upon receiving the command, the command analysis unit 5202 of the post-processing apparatus 102 analyzes the received command, and transmits a result thereof (acceptance or rejection) to the image forming apparatus 101.

In the present exemplary embodiment, upon receiving the command, the communication partner analyzes the received command and transmits a result thereof (acceptance or rejection). Then, the apparatus continues the processing subsequent thereto if receiving the acceptance, and does not perform the processing subsequent thereto if receiving the rejection. FIG. 7 illustrates the sequence performed between the image forming apparatus 101 and the post-processing apparatus 102, but this sequence is not limited to being performed between these apparatuses 101 and 102.

Figure 8:
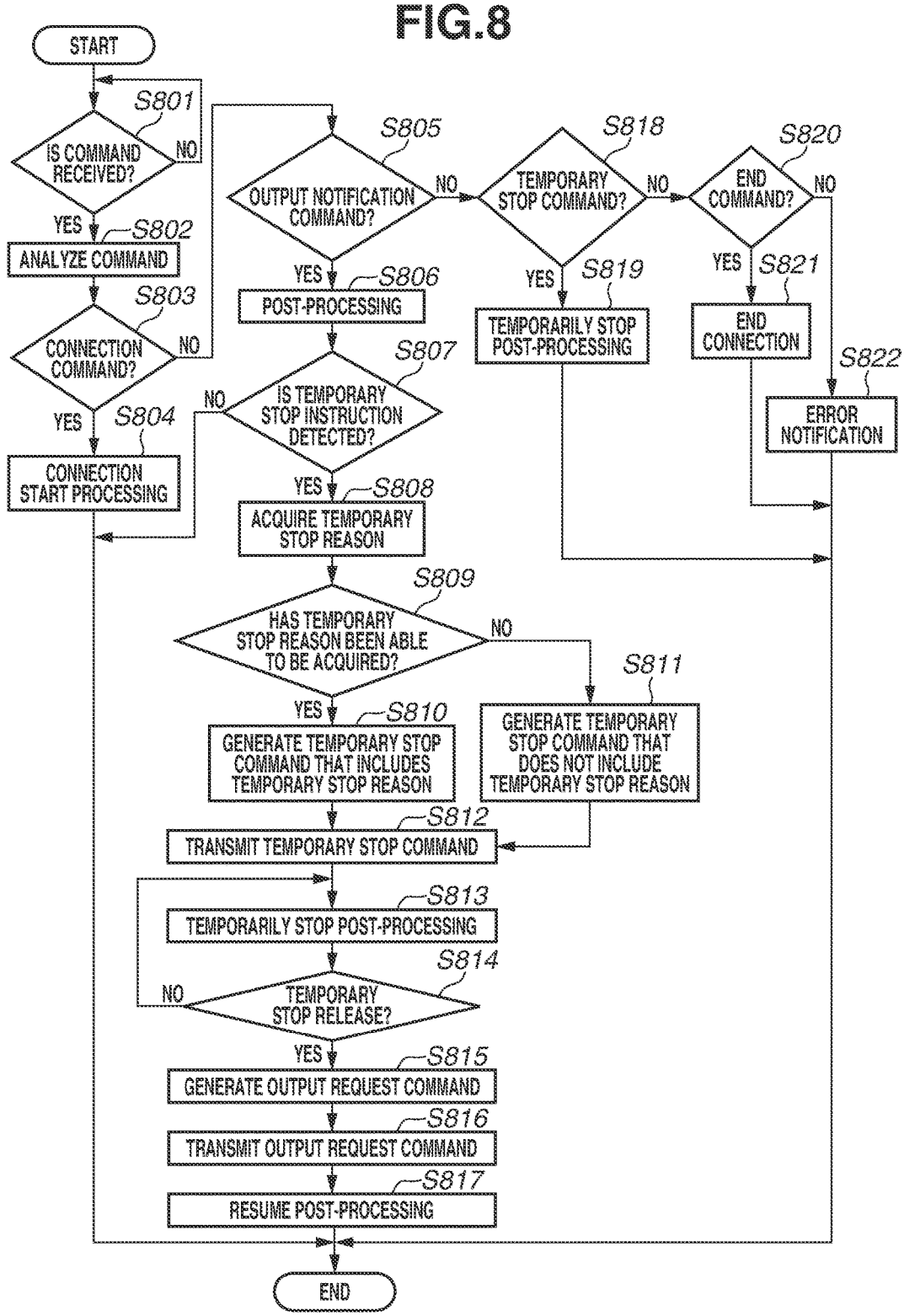
FIG. 8 illustrates a flow of processing performed by the post-processing apparatus according to the present exemplary embodiment.

FIG. 8 illustrates a flow from a time of when the post-processing apparatus 102 according to the present exemplary embodiment receives the command (the message) from another apparatus until a time of when the post-processing apparatus 102 performs the processing according to the command. The program regarding each flow is stored in the storage unit 311 of the post-processing apparatus 102, and is read into the RAM 309 to be executed by the CPU 308.

In step S801, the communication processing unit 5201 determines whether the command (the message) is received. In a case where the communication processing unit 5201 determines that the command is received (YES in step S801), the processing proceeds to step S802. In step S802, the command analysis unit 5202 analyzes the received command (the message). In step S803, the command analysis unit 5202 determines whether the analyzed command is the connection command illustrated in FIG. 13B. More specifically, the command analysis unit 5202 confirms whether the PipeID attribute is specified in the Component element illustrated in FIG. 13B. Then, in a case where the PipeID attribute is specified, the command analysis unit 5202 determines that the analyzed command is the connection command (YES in step S803). In a case where the PipeID attribute is not specified, the command analysis unit 5202 determines that the analyzed command is not the connection command (NO in step S803). In a case where the analyzed command is the connection command (YES in step S803), the processing proceeds to step S804. In a case where the analyzed command is not the connection command (NO in step S803), the processing proceeds to step S805. In step S804, the communication processing unit 5201 performs connection start processing for the communication with the image forming apparatus 101. First, the communication processing unit 5201 stores the above-described received command into the job information storage unit 5206. Next, the communication processing unit 5201 establishes the communication based on PipeID written in the above-described command. More specifically, the communication processing unit 5201 acquires PipeID="PipeSheet" in the Component element illustrated in FIG. 13B, generates the connection having PipeSheet as the ID thereof, and initializes a socket for the communication with the image forming apparatus 101.

In step S805, the command analysis unit 5202 determines whether the analyzed command is the output notification command ("Push"). In a case where the command analysis unit 5202 determines that the analyzed command is the output notification command (YES in step S805), the processing proceeds to step S806. In a case where the command analysis unit 5202 determines that the analyzed command is not the output notification command (NO in step S805), the processing proceeds to step S818. In step S806, the job control unit 5204 instructs the device control unit 5205 to perform the post-processing, thereby causing the post-processing unit 5208 to perform the post-processing.

In step S807, the job control unit 5204 detects a temporary stop instruction issued from the receiving unit 5210. Alternatively, the job control unit 5204 detects a temporary stop instruction issued from the device control unit 5205. In a case where the job control unit 5204 detects the temporary stop instruction (YES in step S807), the processing proceeds to step S808. In a case where the job control unit 5204 does not detect the temporary stop instruction (NO in step S807), the processing is ended. The temporary stop instruction includes information indicating the temporary stop reason. A unit that generates the temporary stop instruction may be the receiving unit 5210 or may be device control unit 5205. In a case where the post-processing apparatus 102 is subject to some incident influential to the system and is temporarily stopped (for example, the cutting apparatus cuts the paper obliquely, or a paper jam or a machine trouble has occurred), the post-processing unit 5208 detects that the post-processing apparatus 102 is subject to the incident influential to the system, and notifies the device control unit 5205 of a result of the detection. After that, the device control unit 5205 generates the temporary stop instruction, and notifies the job control unit 5204 of the generated instruction. In a case where the post-processing apparatus 102 is temporarily stopped although the cause therefor is not influential to the system (for example, the door of the post-processing apparatus 102 is opened), the device control unit 5205 detects a status of the post-processing apparatus 102, and generates the temporary stop instruction to notify the job control unit 5204 of the generated instruction. The receiving unit 5210 generates the temporary stop instruction, and notifies the job control unit 5204 of the generated instruction.

In step S808, the detection unit 5209 acquires the reason for the temporary stop. The detection unit 5209 acquires the reason for the temporary stop from the temporary stop instruction detected in step S807. In a case where this temporary stop is the temporary stop detected by the post-processing apparatus 102, the detection unit 5209 acquires the reason why the post-processing apparatus 102 has been temporarily stopped. In a case where the post-processing apparatus 102 is instructed to temporarily stop the post-processing with use of a screen for temporarily stopping a job illustrated in FIG. 14, which will be described below, the detection unit 5209 acquires a temporary stop reason that is input on the screen for temporarily stopping a job illustrated in FIG. 14.

Figure 14:
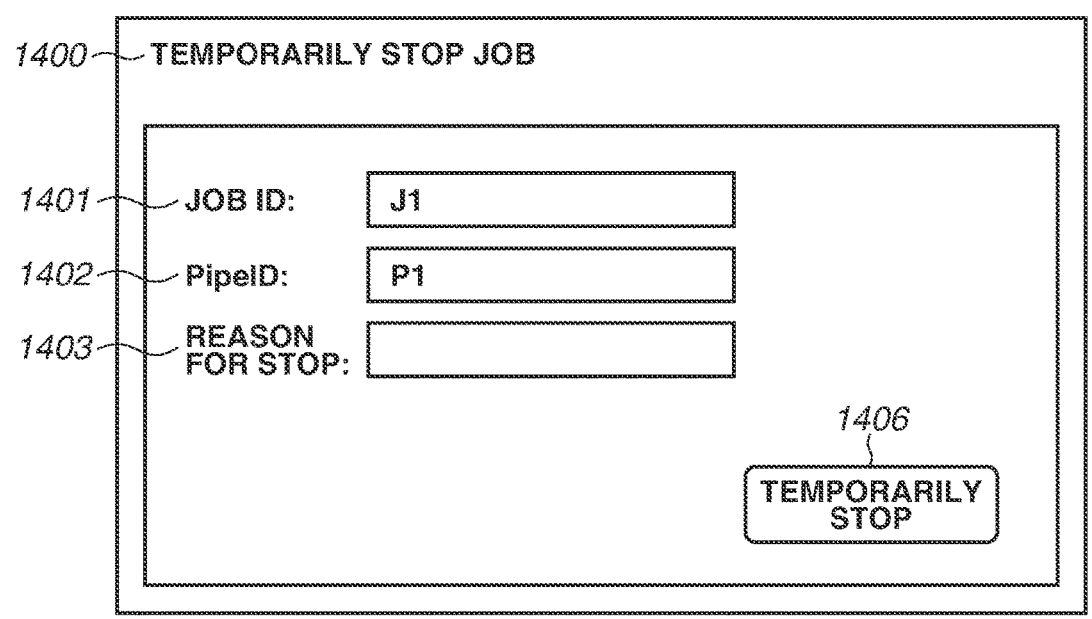
FIG. 14 illustrates an example of an operation panel of the post-processing apparatus according to the present exemplary embodiment.

FIG. 14 illustrates an example of the screen for temporarily stopping a job, which is displayed on the operation unit 304 of the post-processing apparatus 102 illustrated in FIG. 3. A textbox 1401 receives an input of the job ID. The job stored in the job information storage unit 5206 is identified based on the job ID input in the textbox 1401. A textbox 1402 receives PipeID for identifying communication for each job exchanged between the post-processing apparatus 102 and the image forming apparatus 101. The control performed for the textbox 1402 as the user interface may be any kind of control as long as this control can be used for identifying communication for each job, and may be, for example, a drop-down list or a list box. A button 1406 is used for issuing the command for temporarily stopping the processing performed together with the communication partner. When the temporary stop button 1406 is pressed, the temporary stop command is transmitted to the image forming apparatus 101. FIG. 14 illustrates the example in which the reason for the temporary stop and the like are input via the screen for temporarily stopping a job, but the input method is not limited thereto. For example, the reason for the temporary stop may be input with use of a barcode indicating the reason for the temporary stop.

In step S809, the detection unit 5209 determines whether the temporary stop reason has been able to be acquired in step S808. In a case where the detection unit 5209 determines that the temporary stop reason has been able to be acquired (YES in step S809), the processing proceeds to step S810. In a case where the detection unit 5209 determines that the temporary stop reason has been unable to be acquired (NO in step S809), the processing proceeds to step S811. In step S810, the command generation unit 5203 generates the temporary stop command (the "Pause" command) that includes the temporary stop reason. In step S811, the command generation unit 5203 generates the temporary stop command (the "Pause" command) that does not include the temporary stop reason.

In step S812, the communication processing unit 5201 transmits the temporary stop command generated in step S810 or S811 to the image forming apparatus 101.

In step S813, the job control unit 5204 instructs the device control unit 5205 to temporarily stop the post-processing, thereby causing the post-processing unit 5208 to stop the post-processing. In step S814, the job control unit 5204 detects a temporary stop release instruction issued from the receiving unit 5210. Alternatively, the job control unit 5204 detects a temporary stop release instruction issued from the device control unit 5205. In a case where the temporary stop release instruction is received (YES in step S814), the processing proceeds to step S815. In a case where the temporary stop release instruction is not received (NO in step S814), the processing proceeds to step S813, and the post-processing apparatus 102 maintains the temporary stop.

In step S815, the command generation unit 5203 generates the output request command (the "Pull" command) for instructing the image forming apparatus 101 to resume the processing as indicated by step 708 illustrated in FIG. 7.

In step S816, the communication processing unit 5201 transmits the above-described output request command generated in step S813 to the image forming apparatus 101. In step S817, the job control unit 5204 instructs the device control unit 5205 to resume the post-processing, thereby causing the post-processing unit 5208 to resume the post-processing.

In step S818, the command analysis unit 5202 determines whether the analyzed command is the temporary stop command (the "Pause" command). In a case where the command analysis unit 5202 determines that the analyzed command is the temporary stop command (YES in step S818), the processing proceeds to step S819. In a case where the command analysis unit 5202 determines that the analyzed command is not the temporary stop command (NO in step S818), the processing proceeds to step S820. In step S819, the job control unit 5204 instructs the device control unit 5205 to temporarily stop the post-processing, thereby causing the post-processing unit 5208 to stop the post-processing.

In step S820, the command analysis unit 5202 determines whether the analyzed command is the end command (the "Close" command). In a case where the command analysis unit 5202 determines that the analyzed command is the end command (YES in step S820), the processing proceeds to step S821. In a case where the command analysis unit 5202 determines that the analyzed command is not the end command (NO in step S820), the processing proceeds to step S822. In step S821, the communication processing unit 5201 ends the connection with the image forming apparatus 101. Further, the job control unit 5204 waits for an end of the post-processing performed by the post-processing unit 5208. Upon the end of the post-processing, the job control unit 5204 notifies the device control unit 5205 of the end of the post-processing, and deletes the job information from the job information storage unit 5206. In step S822, the image forming apparatus 101 is notified that the command analysis unit 5202 has failed in the analysis via the communication processing unit 5201.

Figure 9:
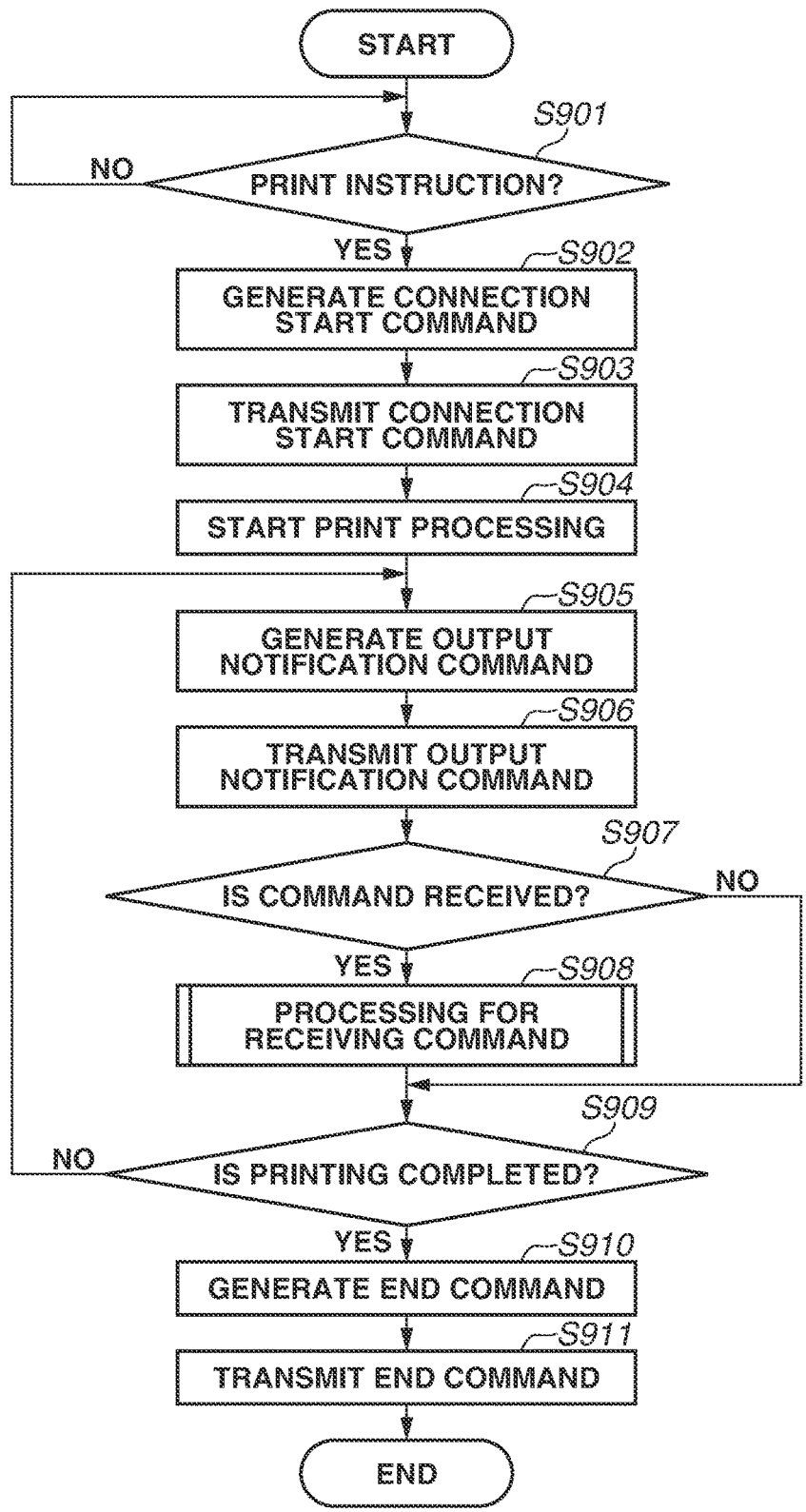
FIG. 9 illustrates a flow of processing performed by the image forming apparatus according to the present exemplary embodiment.

FIG. 9 illustrates a flow from a time of when the image forming apparatus 101 according to the present exemplary embodiment starts the print processing until a time of when the image forming apparatus 101 ends the print processing. The program regarding each flow is stored in the storage unit 212 of the image forming apparatus 101, and is read into the RAM 210 to be executed by the CPU 209.

In step S901, the job control unit 5102 determines whether the print instruction is received based on reception of the print job from another apparatus via the communication processing unit 5105 or based on an operation input onto the operation unit 204. The print job is received from, for example, the information processing apparatus 103 or the post-processing apparatus 102. In a case where the job control unit 5102 determines that the print instruction is received (YES in step S901), the processing proceeds to step S902. In step S902, the command generation unit 5104 generates the connection start command (a command 1600 illustrated in FIG. 13B) for carrying out the communication as indicated by step 701 illustrated in FIG. 7. In step S903, the image forming apparatus 101 transmits the connection start command generated by the command generation unit 5104 in step S902 to the apparatus that is the communication destination via the communication processing unit 5105. In the present exemplary embodiment, the apparatus that is the communication destination, which is described with reference to FIG. 9, is the post-processing apparatus 102.

In step S904, the job control unit 5102 causes the image forming unit 5112 to start the print processing via the device control unit 5101. For example, the print processing is sequentially performed for each unit of the product (for example, one copy at a time). In step S905, the command generation unit 5104 generates the command (the "Push" command) for notifying the apparatus that is the communication destination that the image forming apparatus 101 has started the print processing. In step S906, the image forming apparatus 101 transmits the command (the "Push" command) generated by the command generation unit 5104 in step S905 to the apparatus that is the communication destination via the communication processing unit 5105.

In step S907, the communication processing unit 5105 determines whether the command (the message) is received. In a case where the communication processing unit 5105 determines that the command is received (YES in step S907), the processing proceeds to step S908. In step S908, the communication processing unit 5105 performs processing for receiving the command illustrated in FIG. 10. In step S909, the job control unit 5102 determines whether the image forming apparatus 101 has completed processing all of print jobs with respect to which the instruction has been received (for example, whether the image forming apparatus 101 has completed printing all copies). In a case where the job control unit 5102 determines that the image forming apparatus 101 has completed processing all of the print jobs (YES in step S909), the processing proceeds to step S910. In a case where the job control unit 5102 determines that there is still the print job left to be processed (NO in step S909), the processing proceeds to step S905 (for example, the image forming apparatus 101 performs the print processing of a next copy).

In step S910, the command generation unit 5104 generates the command indicating the end of the processing (the "Close" command). In step S911, the image forming apparatus 101 transmits the command (the "Close" command) generated by the command generation unit 5104 in step S910 to the apparatus that is the communication destination via the communication processing unit 5105.

Figure 10:
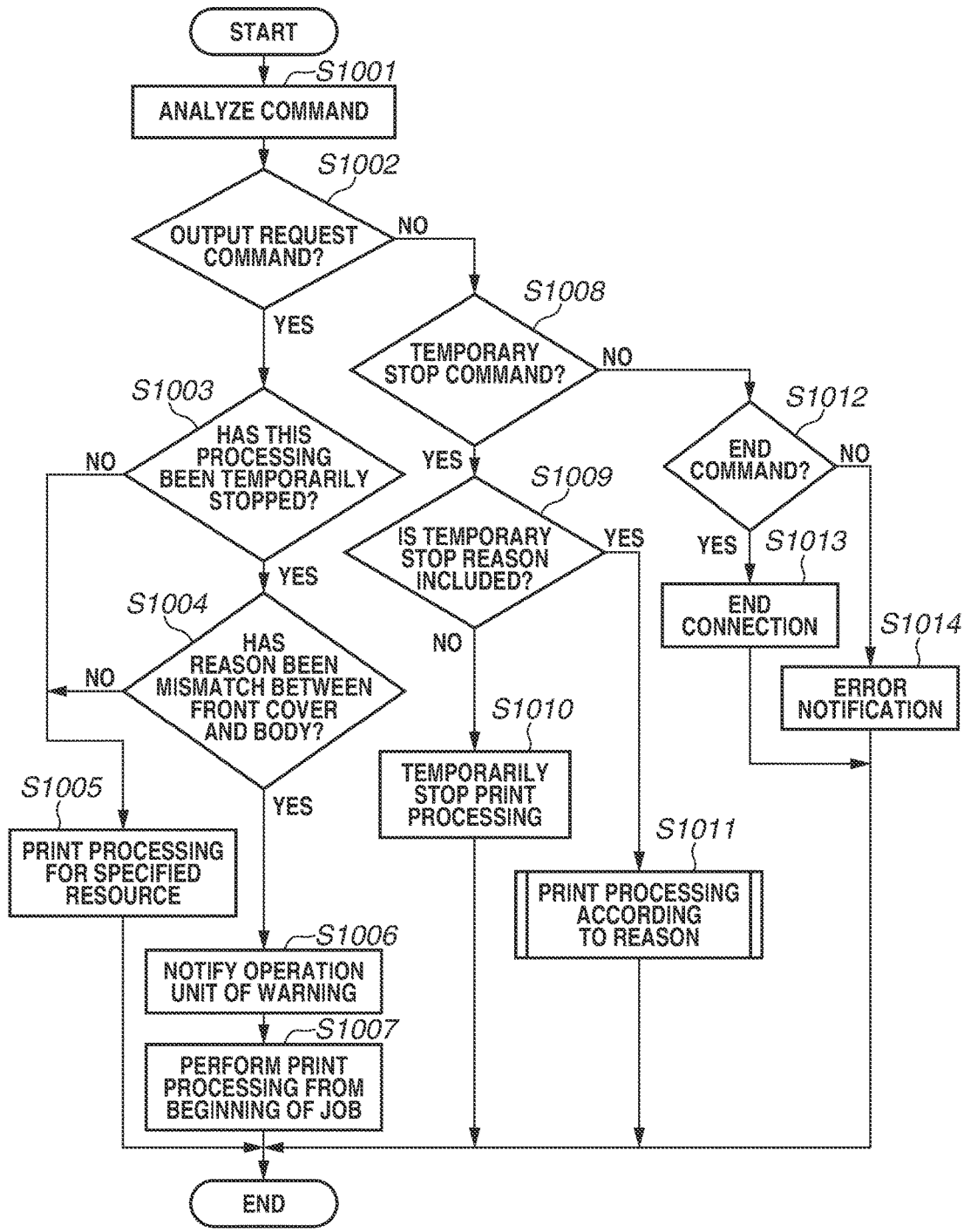
FIG. 10 illustrates a flow of processing for receiving a command, which is performed by the image forming apparatus according to the present exemplary embodiment.

FIG. 10 illustrates a flow of the processing for receiving the command, which is performed in step S908 illustrated in FIG. 9. The program regarding each flow is stored in the storage unit 212 of the image forming apparatus 101, and is read into the RAM 210 to be executed by the CPU 209.

In step S1001, the command analysis unit 5103 analyzes the received command (the message). In step S1002, the command analysis unit 5103 determines whether the analyzed command is the output request command ("Pull"). In a case where the command analysis unit 5103 determines that the analyzed command is the output request command (YES in step S1002), the processing proceeds to step S1003. In a case where the command analysis unit 5103 determines that the analyzed command is not the output request command (NO in step S1002), the processing proceeds to step S1008.

In step S1003, the job control unit 5102 checks the information 1705 indicating whether the temporary stop command has been received, which is included in the list 1700 illustrated in FIG. 12C, thereby confirming whether this processing has been temporarily stopped by the post-processing apparatus 102. In a case where this processing has been temporarily stopped (YES in step S1003), the processing proceeds to step S1004. In a case where this processing has not been temporarily stopped (NO in step S1003), the processing proceeds to step S1005.

In step S1004, the reason determination unit 5108 checks the temporary stop reason 1706 in the list 1700 illustrated in FIG. 12C, thereby confirming whether the content of the temporary stop reason has been a mismatch between the front cover and the body of the case-binding product. In a case where the content of the temporary stop reason has been the mismatch (YES in step S1004), the processing proceeds to step S1006. In a case where the content of the temporary stop reason has not been the mismatch (NO in step S1004), the processing proceeds to step S1105. In a case where the content of the temporary stop reason has been the mismatch between the front cover and the body of the case-binding product, it is highly likely that products after that would also end up containing front covers and bodies output in orders not corresponding to each other. Even if these failed front cover and body are reprinted, the error cannot be resolved. Further, if the image forming apparatus 101 is performing variable printing that handles personal information, it is highly likely that the front cover and the body are respectively associated with different individuals, which means that the information processing system falls into a situation incapable of handing the output to a customer as the product. The printing should be retried from the beginning even by discarding all products printed until now, so as to prevent information of another individual from being mixed in.

In step S1005, the job control unit 5102 causes the image forming unit 5112 to perform the print processing via the device control unit 5101.

In step S1006, the job control unit 5102 notifies the operation unit 204 of the image forming apparatus 101 of a warning. In step S1007, the job control unit 5102 performs the print processing from the beginning of the job.

In step S1008, the command analysis unit 5103 determines whether the analyzed command is the temporary stop command (the "Pause" command). In a case where the command analysis unit 5103 determines that the analyzed command is the temporary stop command (YES in step S1008), the processing proceeds to step S1009. In a case where the command analysis unit 5103 determines that the analyzed command is not the temporary stop command (NO in step S1008), the processing proceeds to step S1012. In step S1009, the command analysis unit 5103 determines whether the temporary stop reason is included in the analyzed command. In a case where the command analysis unit 5103 determines that the temporary stop reason is included in the analyzed command (YES in step S1009), the processing proceeds to step S1011. In a case where the command analysis unit 5103 determines that the temporary stop reason is not included in the analyzed command (NO in step S1009), the processing proceeds to step S1010. In step S1010, the job control unit 5102 instructs the device control unit 5101 to temporarily stop the print processing, thereby causing the image forming unit 5112 to stop the print processing. Further, the job control unit 5102 sets "RECEIVED" as the information 1705 indicating whether the temporary stop command has been received, which is included in the list 1700 illustrated in FIG. 12C.

Figure 11:
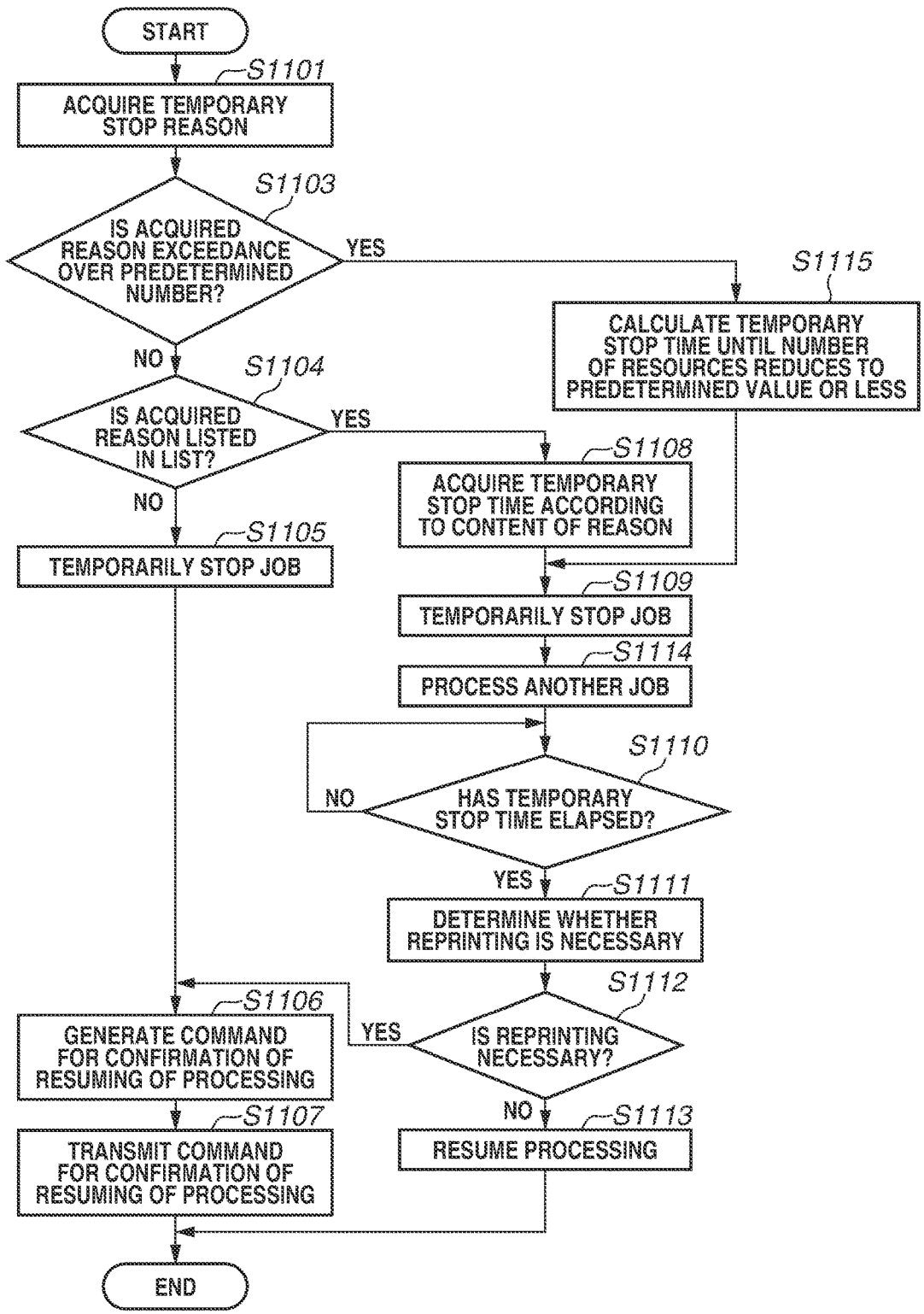
FIG. 11 illustrates a flow of print processing according to a temporary stop reason, which is performed by the image forming apparatus according to the present exemplary embodiment.

In step S1011, the job control unit 5102 performs the print processing according to the temporary stop reason that is illustrated in FIG. 11. Further, the job control unit 5102 sets "RECEIVED" as the information 1705 for indicating whether the temporary stop command has been received, which is included in the list 1700 illustrated in FIG. 12C, and further stores the temporary stop reason written in the received temporary stop command into the temporary stop reason 1706 in the list 1700 illustrated in FIG. 12C. In step S1012, the command analysis unit 5103 determines whether the analyzed command is the end command (the "Close" command). In a case where the command analysis unit 5103 determines that the analyzed command is the end command (YES in step S1012), the processing proceeds to step S1013. In a case where the command analysis unit 5103 determines that the analyzed command is not the end command (NO in step S1012), the processing proceeds to step S1014.

In step S1013, the communication processing unit 5105 ends the connection with the apparatus to which the image forming apparatus 101 is currently connected. Further, the job control unit 5102 waits for an end of the print processing performed by the image forming unit 5112. Upon the end of the print processing, the job control unit 5102 notifies the device control unit 5101 of the end of the print processing, and deletes this job information from the job information storage unit 5107. In step S1014, the apparatus to which the image forming apparatus 101 is currently connected is notified that the command analysis unit 5103 has failed in the analysis via the communication processing unit 5105.

FIG. 11 illustrates a flow of the print processing according to the temporary stop reason, which is performed in step S1011 illustrated in FIG. 10. The program regarding each flow is stored in the storage unit 212 of the image forming apparatus 101, and is read into the RAM 210 to be executed by the CPU 209.

In step S1101, the reason determination unit 5108 acquires the temporary stop reason from the temporary stop command (the "Pause" command). More specifically, the reason determination unit 5108 acquires the value of the Reason attribute illustrated in FIG. 6A. Further, in a case where the StatusDetails attribute is specified in the temporary stop command, the reason determination unit 5108 also acquires the value thereof. In a case where the reason determination unit 5108 determines that the acquired temporary stop reason is the exceedance of the number of resources over the predetermined value ("ExceededIntendedQuantity") in step S1103 (YES in step S1103), the processing proceeds to step S1115. In a case where the reason determination unit 5108 determines that the number of resources does not exceed the predetermined value (NO in step S1103), the processing proceeds to step S1104.

In step S1104, the reason determination unit 5108 determines whether the acquired temporary stop reason is the temporary stop reason listed in the held list. More specifically, the reason determination unit 5108 determines whether the value of the Reason attribute or the StatusDetails attribute is included in the column 1201 in the list 1200 illustrated in FIG. 12A. In a case where the reason determination unit 5108 determines that the value of the Reason attribute or the StatusDetails attribute is included in the column 1201 in the list 1200 (YES in step S1104), the processing proceeds to step S1108. In a case where the reason determination unit 5108 determines that the value of the Reason attribute or the StatusDetails attribute is not included in the column 1201 in the list 1200 (NO in step S1104), the processing proceeds to step S1105.

In step S1105, the job control unit 5102 instructs the device control unit 5101 to temporarily stop the processing for the job with respect to which the temporary stop command has been received from the post-processing apparatus 102. The device control unit 5101 temporarily stops the processing for the job.

In step S1106, the job control unit 5102 instructs the command generation unit 5104 to generate the command for confirming whether the image forming apparatus 101 is permitted to resume the processing (the "Push" command). Upon receiving this instruction, the command generation unit 5104 generates the command for confirming whether the image forming apparatus 101 is permitted to resume the processing (the "Push" command). A response to the confirmation command is any of the temporary stop command (the "Pause" command) and the output request command (the "Pull" command). The processing performed by the image forming apparatus 101 according to the response is as illustrated in FIG. 10. In step S1107, the communication processing unit 5105 transmits the above-described command generated by the command generation unit 5104 to the post-processing apparatus 102. In step S1107, the communication processing unit 5105 is controlled so as to transmit the command after a predetermined time has elapsed since the acquisition of the temporary stop command.

In step S1108, the acquisition unit 5110 acquires the temporary stop time based on the content of the temporary stop reason. More specifically, the acquisition unit 5110 identifies an item that matches the value of the Reason attribute or the StatusDetails attribute illustrated in FIG. 6A from the column 1201 illustrated in FIG. 12A, and acquires the waiting time of the identified item from the columns 1202 and 1203 illustrated in FIG. 12A. In the case of the command 6101 illustrated in FIG. 6A, the value of the StatusDetails attribute is DoorOpen, so that the acquisition unit 5110 can acquire the value of ninety seconds. In step S1109, the job control unit 5102 instructs the device control unit 5101 to temporarily stop the processing for the job with respect to which the temporary stop command has been received from the post-processing apparatus 102. The device control unit 5101 temporarily stops the processing for the job.

In step S1114, the job control unit 5102 processes another job processable within the temporary stop time. More specifically, the job control unit 5102 processes a job that is waiting to be printed in the image forming apparatus 101, is not supposed to be processed by the post-processing apparatus 102, and is processable within the temporary stop time. An estimated processing time is held for each print job, and whether the job is processable within the temporary stop time is determined based on this information.

In step S1110, the job control unit 5102 determines whether the temporary stop time has elapsed. In a case where the job control unit 5102 determines that the temporary stop time has elapsed (YES in step S1110), the processing proceeds to step S1111. In a case where the job control unit 5102 determines that the temporary stop time has not yet elapsed (NO in step S1110), the processing remains in step S1110. In step S1111, the reprinting determination unit 5111 acquires the device ID written in the temporary stop command, and determines the type of the post-processing apparatus 102. Further, the reprinting determination unit 5111 determines whether the reprinting is necessary based on the content of the temporary stop reason. For example, in a case where the type of the post-processing apparatus 102 is the cutting apparatus, the occurrence of the double feed of paper necessitates a retry of the printing from the job corresponding to this paper. On the other hand, in a case where the type of the post-processing apparatus 102 is the case binding apparatus, the occurrence of the double feed of paper allows the image forming apparatus 101 to resume the printing without confirmation after the door of the case binding apparatus is opened and the paper is removed. Therefore, the reprinting determination unit 5111 checks the type of the device (for example, the cutting apparatus) and the temporary stop reason (for example, the double feed of paper), and determines whether the reprinting is necessary. Regarding this determination, information indicating whether the reprinting is necessary is held in a list for each device type and each temporary stop reason, and the reprinting determination unit 5111 makes this determination by using this list.

In a case where the reprinting determination unit 5111 determines that the reprinting is necessary in step S1112 (YES in step S1112), the processing proceeds to step S1106. In a case where the reprinting determination unit 5111 determines that the reprinting is unnecessary in step S1112 (NO in step S1112), the processing proceeds to step S1113. In step S1113, the job control unit 5102 resumes the processing for the job. In step S1115, a calculation unit calculates a time that would be taken until a time of when the number of resources reduces to the predetermined value or less. FIG. 12B illustrates the list 1300 indicating the post-processing apparatus and the time required for this post-processing apparatus to process one resource. The calculation unit acquires the time required for the post-processing apparatus 102 to process one resource from the list 1300, and calculates the time that would be taken until a time of when the number of resources reduces to the predetermined value or less. In a case where the post-processing apparatus 102 performs a plurality of kinds of post-processing, the calculation unit calculates this time also in consideration of the kinds of post-processing.

In the present exemplary embodiment, the image forming apparatus 101 is configured to transmit the confirmation of the resuming after the predetermined time has elapsed since the acquisition of the temporary stop command in step S1107. However, steps S1106 and S1107 may be omitted. In such a case, the image forming apparatus 101 maintains the stop of the processing until receiving the output request command from the post-processing apparatus 102.

According to the present exemplary embodiment, when the temporary stop time can be estimated from the temporary stop reason, this estimation allows the image forming apparatus 101 to process another job within this temporary stop time. The examples of the case where the temporary stop occurs due to the exceedance of the number of resources over the predetermined value and the case where the temporary stop occurs due to the temporary stop reason listed in the list 1200 illustrated in FIG. 12A are described above on the assumption that the temporary stop time can be estimated from the temporary stop reason, but they are merely examples.

Further, according to the present exemplary embodiment, in a case where the temporary stop time can be estimated from the temporary stop reason, the image forming apparatus 101 can resume the processing without confirming the resuming after the temporary stop time has elapsed, and the post-processing apparatus 102 can receive the print product without instructing the image forming apparatus 101 to resume the print processing. Therefore, both the post-processing apparatus 102 and the image forming apparatus 101 can smoothly resume the processing without performing unnecessary processing, which contributes to improvement of the productivity.

Further, if the post-processing apparatus 102 transmits only the temporary stop command to the image forming apparatus 101, the image forming apparatus 101 cannot estimate the stop time, and therefore cannot process another job even if the processing will be temporarily stopped for a long time. Alternatively, the image forming apparatus 101 cannot estimate the stop time, whereby there is also a possibility that the image forming apparatus 101 may start another job anyway. In such a case, the post-processing apparatus 102 may be delayed in resuming the processing. According to the present exemplary embodiment, the post-processing apparatus 102 transmits not only the temporary stop command but also the temporary stop reason to the image forming apparatus 101, so that the image forming apparatus 101 can estimate the temporary stop time, which can result in improvement of both productivity of the image forming apparatus 101 and productivity of the post-processing apparatus 102.

According to the above-described exemplary embodiment, the deterioration in the productivity of the entire system can be reduced even when the print processing performed by the image forming apparatus is temporarily stopped according to the instruction from the post-processing apparatus that performs the post-processing on the product printed by the image forming apparatus.

Other Embodiments

Embodiment(s) of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2015-081159, filed Apr. 10, 2015, which is hereby incorporated by reference herein in its entirety.

What is claimed is:
1. A system comprising:
a printing apparatus; and
a post-processing apparatus,
wherein the post-processing apparatus includes:
at least one processor that operates to:
perform post-processing on a product printed by the printing apparatus, and transmit a command for a temporary stop of print processing for a first job and information indicating a reason for the temporary stop to the printing apparatus, and wherein the printing apparatus includes:

a printer; and at least one processor that operates to:

receive the command for the temporary stop of the print processing for the first job and the information indicating the reason for the temporary stop from the post-processing apparatus, stop the print processing for the first job according to the command for the temporary stop, and acquire a period of the time during which the temporary stop continues, based on the received information indicating the reason for the temporary stop.

2. The system according to claim 1, wherein the at least one processor of the printing apparatus further operates to resume the print processing for the first job based on the acquired period of time during which the temporary stop continues.

3. The system according to claim 1, wherein the at least one processor of the printing apparatus further operates to control print processing for a second job based on the acquired period of time during which the temporary stop continues.

4. The system according to claim 3, wherein the at least one processor of the printing apparatus performs print processing for a job that is printable within the acquired period of time during which the temporary stop continues and does not require the post-processing performed by the post-processing apparatus.

5. The system according to claim 1, wherein the printing apparatus further operates to hold information associating the reason for the temporary stop and the period of time during which the temporary stop continues with each other, and wherein the at least one processor of the printing apparatus acquires the period of time during which the temporary stop continues, based on the received information indicating the reason for the temporary stop and the held information.

6. A printing apparatus comprising:

a printer; and at least one processor that operates to:

receive a command for a temporary stop print processing for a first job and information indicating a reason for the temporary stop from a post-processing apparatus configured to perform post-processing on a product printed by the printer;

stop the print processing for the first job according to the command for the temporary stop; and acquire a period of dime during which the temporary stop continues based on the received information indicating the reason for the temporary stop.

7. The printing apparatus according to claim 6, wherein the at least one processor further operates to resume the print processing for the first job based on the determined acquired period of time during which the temporary stop continues.

8. The printing apparatus according to claim 6, wherein the at least one processor further operates to control print processing for a second job based on the determined acquired period of time during which the temporary stop continues.

9. The printing apparatus a according to claim 8, wherein the at least one processor performs print processing for a job that is printable within the acquired period of time during which the temporary stop continue and dues not require the post-processing performed by the post-processing apparatus.

10. The printing apparatus according to claim 6, wherein the printing apparatus further operates to hold information associating the reason for the temporary stop and the period of time during which the temporary stop continues with each other, and the at least one processor acquires the period of time during which the temporary stop continues, based on the received information indicating the reason for the temporary stop and the held information.

11. A method for controlling a printing apparatus, the method comprising:

performing printing;

receiving a command for a temporary stop of print processing for a first job and information indicating a reason for the temporary stop from a poet-processing apparatus configured to perform post-processing on a product printed by the printing;

stopping the print processing for the first job according to the command for the temporary stop; and acquiring a period of time during which the temporary stop continues, based on the received information indicating the reason for the temporary stop.

12. A non-transitory computer-readable storage medium storing a program for causing a computer to execute a method for controlling a printing apparatus, the method comprising:

performing printing;

receiving a command for a temporary stop of print processing for a first job and information indicating a reason for the temporary stop from a post-processing apparatus configured to perform post-processing on a product printed by the printing;

stopping the print processing for the first job according to the command for the temporary stop; and acquiring a period of time during which the temporary stop continues, based on the received information indicating the reason for the temporary stop.

* * * * *